United States Patent [19]

Harding et al.

[11] Patent Number: 5,495,604
[45] Date of Patent: Feb. 27, 1996

[54] METHOD AND APPARATUS FOR THE MODELING AND QUERY OF DATABASE STRUCTURES USING NATURAL LANGUAGE-LIKE CONSTRUCTS

[75] Inventors: James A. Harding, Issaquah; Jonathan I. McCormack, Renton, both of Wash.

[73] Assignee: Asymetrix Corporation, Bellevue, Wash.

[21] Appl. No.: 112,852

[22] Filed: Aug. 25, 1993

[51] Int. Cl.$^6$ .................................................. G06F 17/30
[52] U.S. Cl. ............................................. 395/600; 395/12
[58] Field of Search ............................ 395/12, 160, 153, 395/600, 157; 364/419

[56] References Cited

U.S. PATENT DOCUMENTS

| | | | |
|---|---|---|---|
| 4,506,326 | 3/1985 | Shaw et al. | 395/700 |
| 4,688,195 | 8/1987 | Thompson et al. | 395/12 |
| 4,939,689 | 7/1990 | Davis et al. | 395/600 |
| 5,197,005 | 3/1993 | Shwartz et al. | 364/419 |

FOREIGN PATENT DOCUMENTS

0522591A2  7/1992  European Pat. Off. .

OTHER PUBLICATIONS

G. Santucci & P. A. Sottile "Query by Diagram: A Visual Environment for Querying Databases" Software—Practice and Experience, vol. 23 (3), pp. 317–340, Mar. 1993.

Czejdo et al. "A Graphical Data Manipulation Language for an Extended Entity Relationship Model" IEEE Computer vol. 23, No. 3, pp. 26–36, 1990.

"A Logical Analysis of Information Systems: static aspects of the data–oriented perspective" by T. A. Halpin, PhD. Thesis, Univ of Queensland, Australia, Jul. 1989.

"Fact–oriented modelling for data analysis" by T. A. Halpin and M. E. Orlowska, J. of Information Systems, vol. 2, No. 2, Blackwell Scientific, Oxford, England, no date.

"Automated mapping of conceptual schemas to relational schemas" J. I. McCormack, T. A. Halpin & P. R. Ritson. Paper presented at the CAiSE Conference, Paris, France Jun. 1993.

*Primary Examiner*—Thomas G. Black
*Assistant Examiner*—Peter Y. Wang

[57] ABSTRACT

Computerized tools for modeling database designs and specifying queries of the data contained therein. Once it is determined that an information system needs to be created, the Fact Compiler of the present invention is invoked to create it. After creating the information system, the user creates a fact-tree as a prelude to generating queries to the system. After creating the fact-tree, the user verifies that it is correct using the Tree Interpreter of the present invention. Once the fact tree has been verified, the Query Mapper of the present invention is used to generate information system queries.

22 Claims, 22 Drawing Sheets

METHOD AND APPARATUS FOR THE MODELING AND QUERY OF DATABASE STRUCTURES USING NATURAL LANGUAGE-LIKE CONSTRUCTS

TECHNICAL FIELD

This invention relates to the creation of computer database systems and the querying of data contained therein. In particular, the invention relates to computerized tools for modeling database designs and specifying queries of the data contained therein.

BACKGROUND ART

Computerized relational databases are used to form information systems which model real world issues and are composed of objects, the relationships i.e., facts, between those objects and the constraints and rules which govern these relationships and objects. Objects are physical or logical entities, capable of being uniquely identified. In this respect, objects are said to be essentially noun-like. Facts define the manner in which objects interact with one another, and are essentially verbs or are verb-like. Constraints modify or constrain the inter-relationships between objects and facts, and as such are analogous to adverbs and pronouns. As the use of information systems increases and the design of such systems advance, so increases the complexity of the real world issues they are expected to accurately model.

In creating an information system, a user needs to accurately transform the real world model, also known as the external view of the data, to its actual physical implementation, using a particular database language on a particular computer system. This implementation is also called the physical view. In order to realize the power inherent in relational databases, it must be made possible for someone with no computing background or education to be able to design and implement information management systems and query meaningful data from them without having to learn a specific computer language.

The physical view of an information system is expressed in one of a number of database design languages. Examples of database design languages well known to those skilled in the art include Structured Query Language (SQL) and Microsoft Access. These database design languages are well adapted to carry out the storage and subsequent retrieval of data stored therein, but the languages themselves are both unnatural and highly technology specific. This means that database design languages are not typically used or understood by the end users of the information systems the languages model. The use of these design languages is a largely intuitive process practiced by database analysts who are familiar with the internal complexities of such languages.

The transformation of an information system from its external view to its physical view is time consuming, and at once formalized while remaining something of an art form. In order to assist database analysts in modeling data for information system design, several Computer Aided Software Engineering (CASE) tool sets have been developed, and are well known to those skilled in the art.

Prior art CASE tool sets were generally based upon entity-relationship modeling (ER). ER models, while providing a useful means of summarizing the main features of an application, are typically incapable of expressing many constraints and derivation rules that commonly occur in that application. An overview of ER-base tools may be found in Ovum (1992) and Reiner (1992) A state-of-the-art example is discussed in Czejdo et al. (IEEE Computer, March 1990, pp.26–37).

In order to capture much more of the detail of an application, object-role modelling (ORM), also known as fact-oriented modeling, was developed. Well known prior art versions of ORM include Natural-Language Information Analysis Method (NIAM), Binary-Relationship Modelling (BRM), Natural Object Role Modelling (NORM), and Predicator Set Model (PSM). One version of ORM, Formal Object Role Modelling (FORM) is based on extensions to NIAM and has an associated language (FORML) with both graphical and textual forms (Halpin and Orlowska, 1992). FORM and FORML were developed in part by one of the inventors of the present invention.

The use of symbol-driven CASE tool sets provides a powerful instrument for conceptualizing the model of a given information system, but their use is not intuitively obvious to the untrained user. For such a user, being able to model information systems using a language with which the user is already facile is a more powerful approach. FORML provides the user with a natural language-like command set, and is thus readily learned.

Several CASE tool sets for object-role modeling exist. Among those known by persons skilled in the art are RIDL (Detroyer et al, 1988; Detroyer 1989; Nienhuys-Cheng 1990), GIST (Shoval et al, 1988) and IAST (Control Data, 1982). RIDL is currently marketed by Intellibase. These ORM-based CASE tool sets generally conform only to a binary-only version of ORM, although RIDL has recently added support for fact types of higher arity. In general, these systems are based upon the explicit "drawing" of symbols on diagram. Users of these tool sets typically specify their information systems by placing symbols directly on diagrams. In the typical CASE tool set, a different tool is used for each type of symbol used. The emphasis in these tool sets is on the notation of the symbols and what they mean, not the underlying semantics of the language upon which the notation rests.

An "optimal normal form" method for mapping from ORM to normalized relational tables was introduced in NIAM in the 1970's. This method ignored certain cases and provided a very incomplete specification of the methodology for constraint mapping. A significant extension of NIAM, capable of completely mapping any conceptual schema expressed in the graphic version of FORML to a redundancy-free, relational schema, was introduced as RMAP (Relational Mapping, Ritson and Halpin, 1992). RMAP differs from other mapping methods, such as RIDL-M, by enabling a wider variety of constraints; e.g., n-ary subset, equality, exclusion, closure and ring constraints.

Database professionals, using ORM-based CASE tool sets are markedly more productive than similar workers without them. A tool set which contains a mapping schema such as RMAP is even more powerful, and results in further productivity. FORML based tool sets which implement RMAP represent the current state of the art with respect to ORM-based tool sets. Given FORML's graphical and textual language forms, the potential exists to combine the power, flexibility and precision of ORM based CASE tool sets with the ease and rapidity of use of graphical user interfaces common in modern computer systems. This will have the effect not only of further increasing the productivity of CASE tool sets in the hands of computer professionals, but will place these powerful software engineering tools in the hands of heretofore naive users as well.

While prior art natural language CASE tools do fulfill some of the promise of their basic concept, they lack the power of the symbol driven systems to model complex databases with facility. Until the present invention, there existed no CASE tool set for database design which combined the power, flexibility and accuracy of ORM using natural language-like constructs with a graphical user interface to translate the natural language-like constructs into ORM symbology and automatically map the conceptual schema so formed into a relational schema for implementation on a number of SQL-like database languages. The present invention effects a six-fold reduction in the number of user operations necessary to draw symbols on ORM-based diagrams by allowing users to type information in an approximately natural language. Users can think about the semantics of information and not waste time laboring on symbol drawing, which dampens the semantic thought process.

In addition to the ER and ORM-based prior art tool sets previously discussed, there have been efforts by other workers to automate the process of database specification using different methodologies. Some of the more pertinent attempts are described below.

U.S. Pat. No. 4,688,196 to Thompson et. al. teaches a natural language interface generating system which allows a naive user to create and query a database based on a system of menu-driven interfaces. As the user addresses command words, in a natural language, to the interface generating system it provides a menu of words which could legally follow each word as it is input. The menu is provided by referencing pre-defined, resident files. Thompson calls these files grammars and lexicons. The commands input by the user are translated by the system, which then provides an automatic interactive system to generate the required interface in the following manner. After the database is loaded in, the interface generating system poses a series of questions to the user's technical expert. In response to these questions, the user or his expert must identify which tables in the database are to be used; which attributes of particular tables are key attributes; what the various connections are between the various tables in the database and what natural language connecting phrases will describe those relations.

U.S. Pat. No. 4,939,689 to Davis et. al. teaches a system for the creation of database structures and subsequent querying of those structures by use of a text driven outliner system. The Davis system uses another form of resident dictionary table, which is again previously defined. In Davis, the user inputs a textual outline which defines the format of the database. This outline is then used to create data entry screens to facilitate data entry.

After creating database information systems (and assuming the data to populate those systems has been input), the information system must be accurately queried. Efforts by others skilled in the present art teach two broad strategies to enable the naive user to form queries.

The first prior art solution to the query generation problem is through the use of natural language parsers. This methodology takes a query which is input in a desired natural language such as English or Japanese, and parses the query into its component parts. Each component of the query is then used to form the translation of the original natural language query into a database language query. Until the present invention, this was typically accomplished by some form of resident database or dictionary file which translated the parsed command words and phrases into their respective equivalents in the database design language.

European Patent Application EP 0522591A2, filed 10 Jul. 1992 by Takanashi et. al., teaches a system typical of this "parse and look up" strategy, whereby a natural language query is entered and parsed into its constituent parts. The parser uses both a resident grammar table and a resident terminology dictionary to translate the meaning of individual command words and phrases into the database design language. The difficulty with fully implementing this solution is the richness and power i.e., the size and variable structure, of most natural languages. Each possible word and many phrases must have a corresponding entry in the resident tables to make the system truly utile. If this is not done, the power of the natural language interface is substantially weakened in that a command will not be understood by the system.

The cost, both monetary and in computer overhead, of creating and maintaining a large, full-time resident natural language interface to any substantial information system is prohibitive. Furthermore, end users are still required to know the types of questions and keywords the parser and resident dictionary files will understand. This is because the resident table methodology does not fully account for the relationships between data objects and the constraints on those objects. For example, if a user wants to know Mr. Smith's age, it is not sufficient to ask "How old is Smith?" since Smith might be a person or the Smith Tower. Instead the user must type "How old is the person called Smith?". As a result, the learning curve for using natural language parsers is still extremely high.

The second solution to the query generation problem in the prior art is through the use of query tools. Query tools are based on the physical structures of the database and not the information contained therein. Information can be broadly categorized as a set of interacting conceptual objects, i.e. things you want to store— e.g., Person, Address, etc. Facts are relationships between objects—e.g. a Person lives at an address. When information is stored in a database, it is represented as a set of physical structures, e.g. tables. Absent considerable database expertise on the part of an end user, the physical representation of the data is invariably unintelligible to him or her. To enable, therefore, such a naive user to query data based on the physical structure it is stored in will require a significant training effort to ensure understanding of these physical structures.

In formulating a query using either a natural language parser or a physical structure query tool, one final issue remains. The user can never be sure that the query which is ultimately formed by either process is actually phrased correctly. When querying physical structures, absent significant training, the naive user doesn't understand the manner in which the data was stored. When using a natural language parser, the same problem arises due to the ambiguity inherent in that natural language. If, for instance, a user asked "How old is Smith?", and the computer answers "55", the answer may be for the person Smith, or the Smith Tower. This is reminiscent of the experience of a reporter who telegraphed Cary Grant's agent, asking about Mr. Grant's age. The reporter, sensitive to the cost per word of sending a telegraph, queried "HOW OLD CARY GRANT?". The actor, when the telegraph was inadvertently delivered to him, replied, again by telegraph, "OLD CARY GRANT JUST FINE". Clearly, unless the syntax of the query is correct, a naive user may retrieve an uncertain answer or an answer to an unintended query.

A common design feature of prior art CASE tools as previously discussed is the use of a pre-defined table or tables both to effect the translation of natural language inputs and to specify the exact nature of the data objects, facts and constraints as well as the interrelationships therebetween. As discussed, this methodology is costly, inefficient and not fully effective.

A further design feature of CASE tools currently in use for information system specification is their use of symbols instead of a natural language. A symbology-driven CASE tool set is at once imprecise and cumbersome, requiring several steps to perform the transformation from a chart of symbols to a database specification in a computer language.

There is therefore a need for apparatus that allows users to specify and create an information system using natural language or natural language-like commands, which will precisely specify the system's objects, facts and constraints without ambiguity or excessive overhead. This means should be capable of graphical depiction to define the interrelationships among the data elements in an unambiguous manner. The information used to create the system should be useable to define both the structure of the database itself as well as subsequent queries to that database once it is completed. There is a another need for a means for a naive user to be able to specify these queries to the system, again using natural language like commands which are not bound by previously entered definitions in a translation table. There is yet another need for a means for ensuring that any query which is created for the purpose of accessing the information system will, precisely and again without ambiguity, convey the user's intended question and return a correct, unambiguous answer.

DISCLOSURE OF INVENTION

The present invention provides a method and apparatus that allows users to:

1. Develop an information system description using a graphical user interface to a natural language-like computer language. One such language is FORML.

creates an object list, a fact list and a constraint list in memory. Then the Fact Compiler iteratively compiles the text into the repository. The repository is essentially a "database of databases". Finally, the validated objects, facts and/or constraints are drawn in proper notation on the ORM conceptual schema diagram. At this point the information system specification may be considered complete.

After the information system has been created, the user may wish to check and/or edit the previously entered information. This is accomplished by using the Decompile function of the Fact Compiler. Decompile is essentially the reverse of the previously discussed Compile function, in that it takes an ORM conceptual schema diagram and returns a textual listing of the objects, facts and constraints entered in the repository. The user can use this listing to verify the information system specification or to edit the system as it exists.

Once the information system specification is complete, the conceptual schema depicted in the ORM representation of the information system is mapped to a relational database using RMAP. The RMAP process is fully described in McCormack et al (1993), which is incorporated by reference as if fully set forth herein. By way of example, for an example set of facts:

Person lives at address

Person has Phone Number

Person studies Subject

Subject is taught by Person if the relational database associated with an example fact tree is:

Person_Table: (Person, Address)

Phone_Table: (Person, Phone Number)

Studies_Table: (Person, Subject Studied)

Subject_Table: (Subject, Teacher Person)

The associated RMAP mappings would be:

| FACT | TABLE | FIRST NOUN COLUMN | SECOND NOUN COLUMN |
| --- | --- | --- | --- |
| Person lives at address | Person_Table | Person | Address |
| Person has Phone Number | Phone_table | Person | Phone Number |
| Person studies Subject | Studies_Table | Person | Subject Studies |
| Subject is taught by Person | Subject_Table | Person | Teacher Person |

2. Specify the fact tree for query generation.
3. Check queries for semantic correctness.
4. Generate queries to the database system.

Once it has been determined that an information system needs to be created, the Fact Compiler of the present invention is invoked. The Compile function of the Fact Compiler enables a user to type in text, using a natural language-like computer language. One such language is FORML. The text is typed in a window provided by the system, and may contain objects (also referred to herein as nouns), facts (also referred to herein as fact types or sentences) and/or constraints. Using a translation function called "Drag and Drop over Diagram" and a graphical user interface, the user then drags the text from the entry window to the appropriate place over the ORM conceptual schema diagram of the Fact Compiler. The user then drops the text onto the diagram. The Fact Compiler validates the text entered and notifies the user of any errors encountered. During validation, the Fact Compiler first parses the text and The first step in query processing is specifying the fact-tree. In Fact-Tree Specification, the user selects a noun relevant to the query. For example, if the user wanted to find out the address, phone number, subjects studied, and teachers of Mr. Smith, they would start with the Person noun because the query is basically about a person. After choosing Person as the root of the query, they can select more information about the person—to find out their address etc. The only information they are able to select is the information contained in the facts about the person, i.e.

0 A person lives at an address.

0 A person has a phone number.

0 A person studies a subject.

0 A person teaches a subject.

This set of facts is all of the information possible about a particular person. The information is displayed conceptually and the user didn't need to know any special keywords or phrases. In this case the user would select the facts 0 A person lives at an address.

0 A person has a phone number.

0 A person studies a subject.

0 A subject is taught by a person.

since that is what they want to know about Mr. Smith. This would build up the following fact-tree.

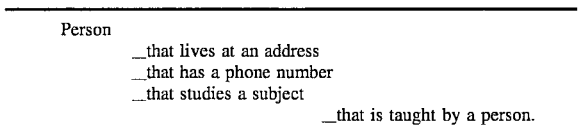

Finally, the user would restrict the person at the root of the tree to be equal to Mr. Smith, since this is the only person they are interested in.

The meaning of the final tree is: Show the person Mr. Smith, the address that he lives at, the phone numbers that he has, the subject that he studies, and for the subjects he studies, show the people that teach those subject.

After generating the fact-tree, the user verifies that the fact-tree is correct using the Tree Interpreter of the present invention. Doing so will preclude the possibility of an ambiguous query being generated. In use, the Tree Interpreter algorithm constructs a natural language description of the fact-tree. This algorithm is a recursive depth-first search function which is described in the following best mode section. This interpretation allows the user to verify that the question he or she is asking will retrieve the information desired.

Once the user has specified the fact-tree and checked it using the Tree Interpreter, all that remains to do is generate the relational query itself. The algorithm to do this is again recursive on fact-tree nodes, and is detailed in the following section detailing the best mode of carrying out the invention.

BRIEF DESCRIPTION OF THE DRAWINGS

The various features and advantages of the present invention may be more readily understood with reference to the following detailed description of the preferred embodiments taken in conjunction with the accompanying drawings, wherein like reference characters designate like elements.

BEST MODE OF CARRYING OUT THE INVENTION

Figure 1:
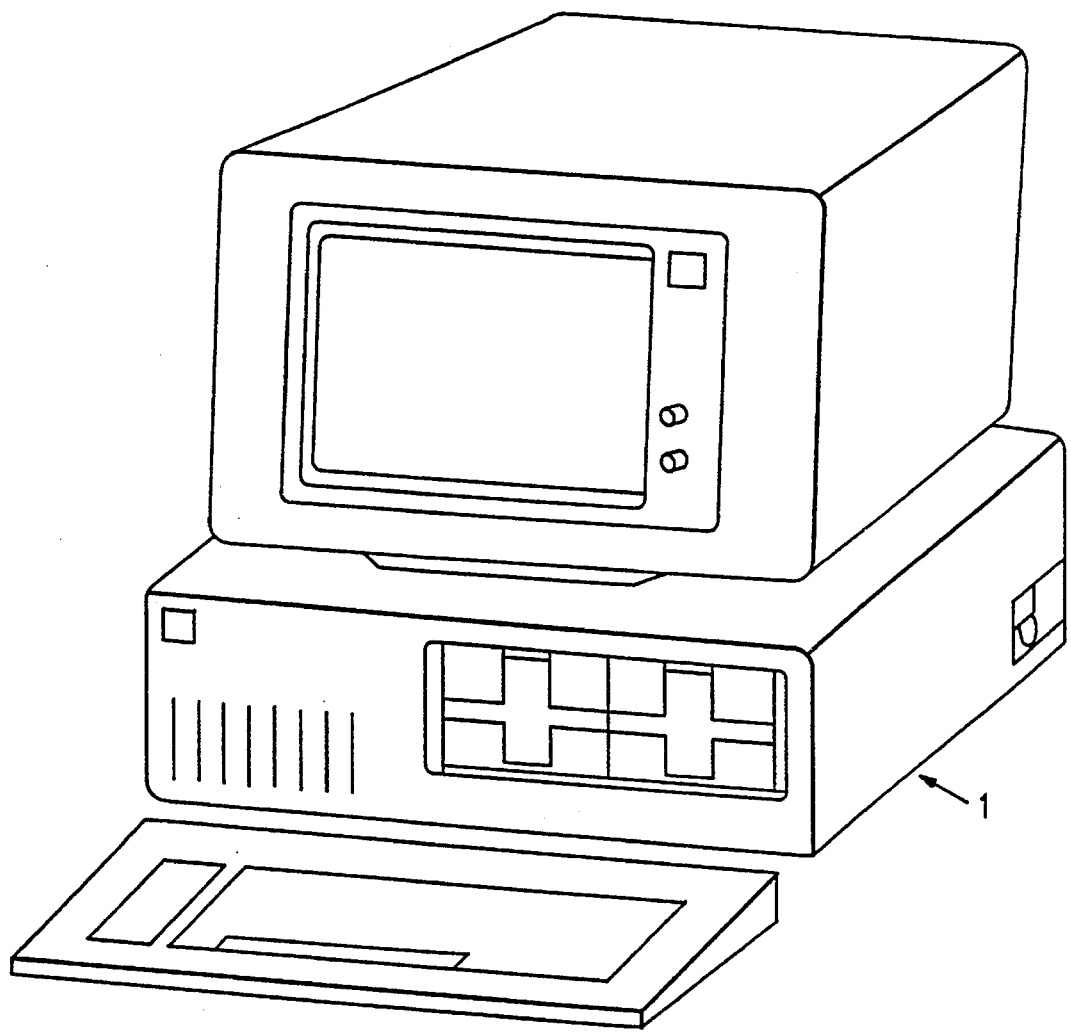
FIG. 1 is a diagram of the external view of a digital, programmable, general purpose computer configured for operation of the present invention.

The preferred embodiment of the present invention incorporates computer system 1 configured as shown in FIG. 1. Computer system 1 is a programmable digital computer. The invention is executable on an IBM compatible computer having an Intel 80386 or higher chip set, operating under the MS-DOS operating system, version 5.0 or higher. A minimum or 6 megabytes of available RAM is required for execution, as is a minimum of 6 megabytes of available hard disk storage space. These computers typically include a CPU, main storage, I/O resources, and a user interface, including a manually operated keyboard and mouse. The present invention also requires a graphical user interface program: Microsoft Windows is one well known example.

The present invention was programmed on an IBM compatible computer having an Intel 80486 chip set, running Microsoft MS-DOS operating system, version 5.0. Microsoft Windows Version 3.1 was installed to provide the required graphical user interface. Finally, the system whose description follows was programmed in the Borland C language.

Figure 2:
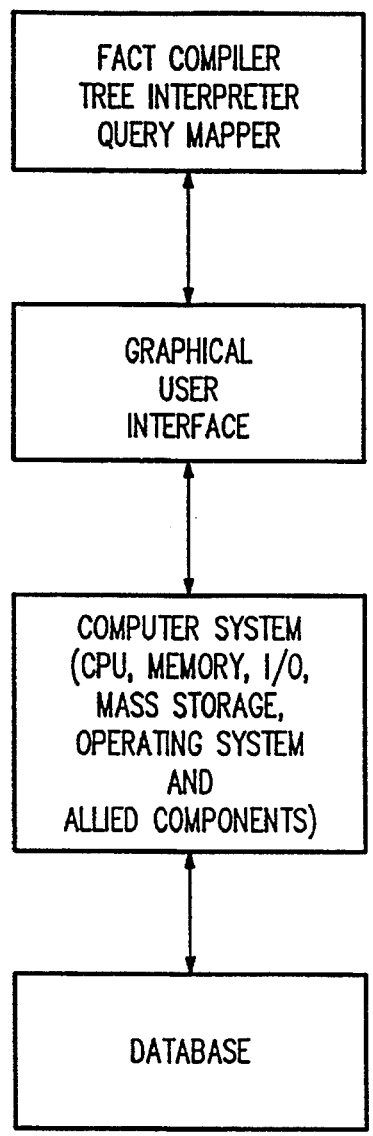
FIG. 2 is a block diagram of the computer of FIG. 1 configured with the present invention.

FIG. 2 depicts the bus structure of the general purpose programmable computer of FIG. 1, with the present invention implemented thereon.

Figure 3:
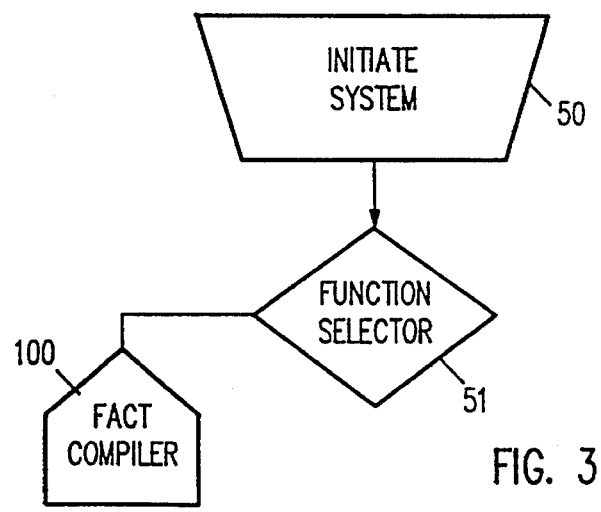
FIG. 3 is a flow chart illustrating the initial selection menu of the present invention, after selecting the Fact Compiler of the present invention.

Referring now to FIG. 3, a user initiates the system at manual input 50 and selects the desired function at function selection 51. The present invention provides a method and apparatus that allows users to:

1. Develop an information system description using a graphical user interface to a natural language-like computer language. One such language is FORML.
2. Specify the fact tree for query generation.
3. Check queries for semantic correctness.
4. Generate queries to the database system.

Once it has been determined that an information system needs to be created, the Fact Compiler of the present invention is invoked. The Compile function of the Fact Compiler enables a user to type in text, using a natural language-like computer language. One such language is FORML. The text is typed in a window provided by the system, and may contain objects, facts and/or constraints. Using a translation function called "Drag and Drop over Diagram" and a graphical user interface, the user then drags the text from the entry window to the appropriate place over the ORM conceptual schema diagram of the Fact Compiler. The user then drops the text onto the diagram. The Fact Compiler validates the text entered and notifies the user of any errors encountered. During validation, the Fact Compiler first parses the text and creates an object list, a fact list and a constraint list in memory. Then the Fact Compiler iteratively compiles the text into the repository. The repository is essentially a "database of databases". Finally, the validated objects, facts and/or constraints are drawn in proper notation on the ORM conceptual schema diagram. At this point the information system specification may be considered complete.

After the information system has been created, the user may wish to check and/or edit the previously entered information. This is accomplished by using the Decompile function of the Fact Compiler. Decompile is essentially the reverse of the previously discussed Compile function, in that it takes an ORM conceptual schema diagram and returns a textual listing of the objects, facts and constraints entered in the repository. The user can use this listing to verify the information system specification or to edit the system as it exists.

Once the information system specification is complete, the conceptual schema depicted in the ORM representation of the information system is mapped to a relational database using RMAP. The RMAP process is fully described in McCormack et al (1993), which is incorporated by reference as if fully set forth herein. By way of example, for an example set of facts:

Person lives at address
Person has Phone Number
Person studies Subject
Subject is taught by Person if the relational database associated with an example fact tree is:

Person_Table: (Person, Address)
Phone_Table: (Person, Phone Number)
Studies_Table: (Person, Subject Studied)
Subject_Table: (Subject, Teacher Person)

The associated RMAP mappings would be:

| FACT | TABLE | FIRST NOUN COLUMN | SECOND NOUN COLUMN |
| --- | --- | --- | --- |
| Person lives at address | Person_Table | Person | Address |
| Person has Phone Number | Phone_table | Person | Phone Number |
| Person studies Subject | Studies_Table | Person | Subject Studies |
| Subject is taught by Person | Subject_Table | Person | Teacher Person, if the relational database associated with an example fact tree is: |

The first step in query processing is specifying the fact-tree. In Fact-Tree Specification, the user selects a noun relevant to the query. For example, if the user wanted to find out the address, phone number, subjects studied, and teachers of Mr. Smith, they would start with the Person noun because the query is basically about a person. After choosing Person as the root of the query, they can select more information about the person—to find out their address etc. The only information they are able to select is the information contained in the facts about the person, i.e.

0 A person lives at an address.
0 A person has a phone number.
0 A person studies a subject.
0 A person teaches a subject.

This set of facts is all of the information possible about a particular person. The information is displayed conceptually and the user didn't need to know any special keywords or phrases. In this case the user would select the facts 0 A person lives at an address.
0 A person has a phone number.
0 A person studies a subject.
   0 A subject is taught by a person.

since that is what they want to know about Mr. Smith. This would build up the following fact-tree.

```
Person
     _that lives at an address
     _that has a phone number
     _that studies a subject
                    _that is taught by a person.
```

Finally, the user would restrict the person at the root of the tree to be equal to Mr. Smith, since this is the only person they are interested in.

The meaning of the final tree is: Show the person Mr. Smith, the address that he lives at, the phone numbers that he has, the subject that he studies, and for the subjects he studies, show the people that teach those subject.

After generating the fact-tree, the user verifies that the fact-tree is correct using the Tree Interpreter of the present invention. Doing so will preclude the possibility of an ambiguous query being generated. In use, the Tree Interpreter algorithm constructs a natural language description of the fact-tree. This algorithm is a recursive depth-first search function which can be summarized as follows:

```
function: Interpret_Tree (fact-tree_node) Il Interpret-Tree operates on a node of
                    the fact-tree
        begin
            If the node is the root of the tree then
                    noun is the noun in the node              e.g.   Person
                    Print 'For all noun(s)'                   e.g.   For all Person(s)
                    if the node has a restriction then        e.g.   is equal to Mr. Smith
                         print "(where noun restriction)"     e.g.   (where Person = Mr. Smith)
                    Print "show:" and move on to a new line
            otherwise
                    noun is the noun in the node              e.g.   Address
                    parent-noun is the noun in the node's parent  e.g.  Person
                    phrase is the phrase in the noun          e.g.   lives at
                    Print "the noun(s) that the parent-noun phrase"  e.g.  the Address(es)
                                                                           that the person
                                                                           lives at
                    if the node has a restriction then        e.g.   is equal to
                                                                     Seattle
                         print "(where noun restriction)"     e.g.   (where address =
                                                                     Seattle)
                    if the node has any children then
                         print ", and for those noun(s) show:"
                    move on to a new line
            for all children of the node do
                    call Interpret_Tree on the child-node
        end
```

The result of Interpret_Tree on the example fact-tree would be

```
For all Person(s) (where Person = Mr. Smith) show:
        the Address that the Person lives at
        he Phone Number that the Person has
        the Subjects that the Person studies,
        and for those subjects show the Person(s) that the
        Subject is taught by.
```

This interpretation allows the user to verify that the question he or she is asking will retrieve the information desired.

Once the user has specified the fact-tree and checked it using the tree interpreter, all that remains to do is generate the relational query itself. The algorithm to do this is again recursive on fact-tree nodes.

```
function Create_Query (fact-tree_node)
begin
node is the node being mapped by this call to the function
child i . . . childn are the children of node
sentence1, . . . sentencen. are the respective sentences for
child i . . . childn each sentence i, (i=1 . . . n) has a mapping'
associated with it. The mapping corresponds to the relational
structure used to represent the sentence and contains the table
that the sentence was mapped to, the column for the first noun
and the column for the second noun. For example, the sentence
```

-continued

```
Person lives at Address maps to the Person table, with noun1
(person) being column 1, and noun2 (address) being column 2.
Join all of the mappings for sentences 1 . . . n together using outer
joins based on the noun in node and the respective positions of
that noun in sentences 1 to n. Form a query, including restriction
when required.
An SQL query representative of this applied to the example
fact-tree would be:
select Person. Person, Phone Number, Subject
from Person, Person has Phone_Number, Person_studies_Subject
Outer join Person. Person = Person has Phone_Number.Person
Outer join Person.Person = Person_studies_Subject.Person
where Person.Person = 'Mr. Smith' . . .
```

If any childi i= 1 . . . n have children, apply Create_Query to child and use an outer join to include the result into the existing query. In the example fact-tree, this would result in Create_Query being executed on the Subject node of the Person that studies Subject branch and would result in the query:

```
select Person.Person, Phone Number, Person_studies_Subject. Subject
    Subject.Person
from Person, Person_has_Phone Number, Person_studies_Subject, Subject
Outer join Person.Person = Person_has_Phone_Number.Person
Outer join Person.Person = Person_studies_Subject.Person
Outer join Person_studies_Subject.Subject = Subject.Subject
where Person.Person = 'Mr. Smith.....
```

Note that SQL is used as a notational convenience and its use has no bearing on the theory behind the algorithm. It is a particular feature of the present invention that any relational language could have been used. The advantages of the Fact Compiler, Query Mapper and Tree Interpreter algorithms of the present invention are that they substantially reduce the number of concepts and amount of training required for a naive end-user to express meaningful queries in a relational database. The algorithm set of the present invention allows users to form conceptual queries without having to know keywords and physical structures. Also, the algorithms of the present invention provide a generated natural language description of the query to assure that the query is correct in syntax. These advantages are illustrated by contrasting the previously described example with the same example expressed in the state of the art natural language and SQL implementations.

To express the query in natural language, the user would need to construct and type in the query:

Show me the person called Mr. Smith, his Address, his Phone Number, the subjects he studies, and, for those subjects show people who teach them The distinct pieces of information required to phrase this query are:

1. An overall knowledge of how to express the query (having to include keywords like person, etc.)
2. The knowledge that you could ask for Address, Phone Numbers, Subjects, etc . . .

Fact Compiler

Figure 4:
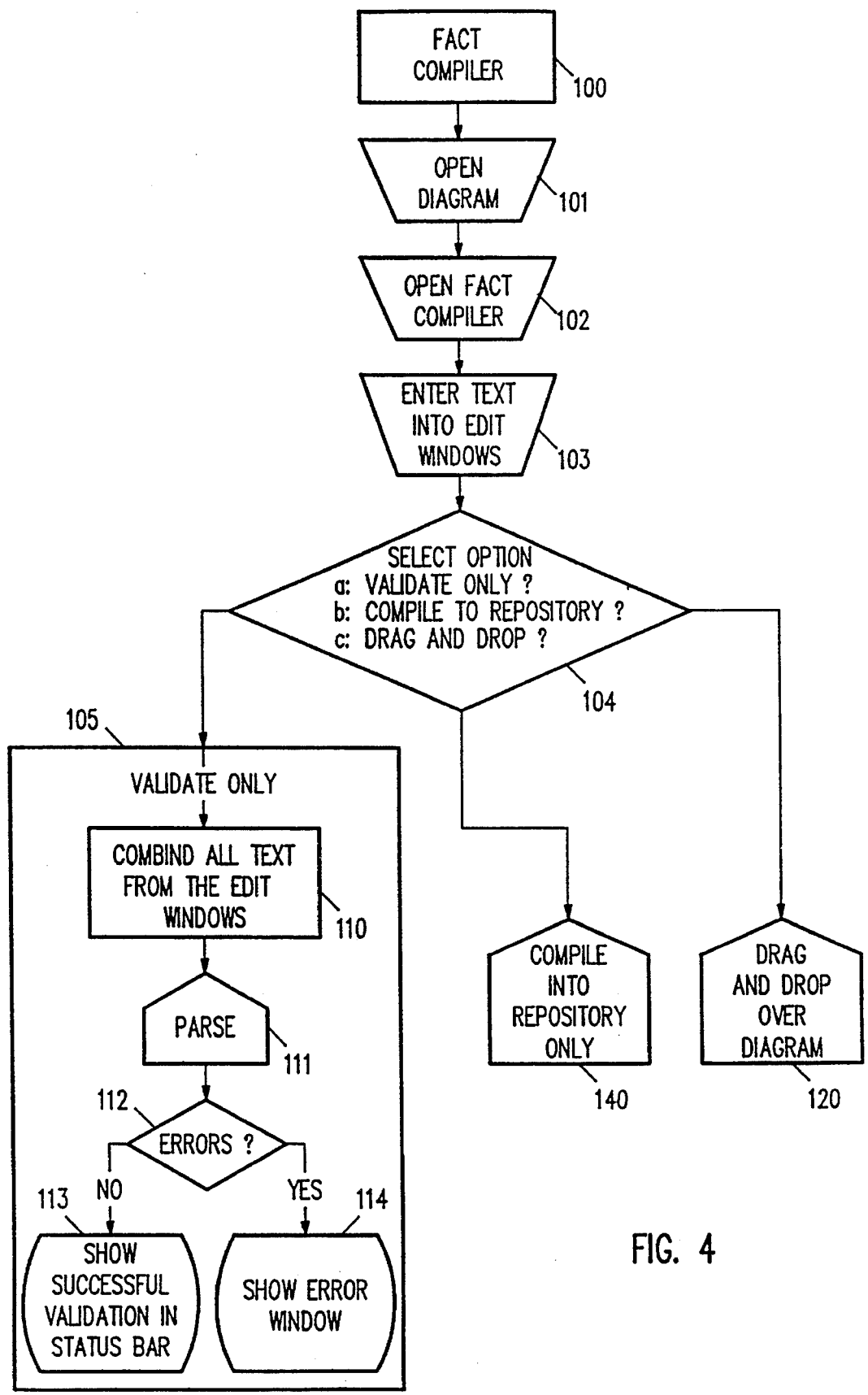
FIG. 4 is a flow chart illustrating the Fact Compiler of the present invention, including it's three main functions.

The fact compiler of the present invention is selected at 100. The fact tree of the present invention is selected at 300. As explained above, a Fact Compiler is provided by the present invention, a detailed description of which follows. Referring now to FIG. 4, after selecting fact compiler 100, the user opens a diagram which represents one level of the information system to be modelled. After opening the fact compiler diagram, the user types in a factual sentence, an object type, or a constraint, using a natural language-like computer language. One such language is FORML. An example of such an input is "the INSTRUCTOR with the ID "100" is qualified to teach the SUBJECT with the name "database design" at the SUBJECT LEVEL 300". At this point, the user may select one of three options: validate the input using Validate Only function 105; compile the information only into the repository 140; or to drag and drop the fact over the diagram at function 120.

Referring now to Validate Only function 105 of FIG. 4 of the present invention, after all text has been combined from the edit windows at 110, it is parsed into its component words using function 111. An error checker at 112 determines if there are errors in the text which is input. If there are no errors, the system indicates successful validation at 113. If error checker 112 determines that there are errors in the textual input, the errors will be shown at error window 114.

Figure 5:
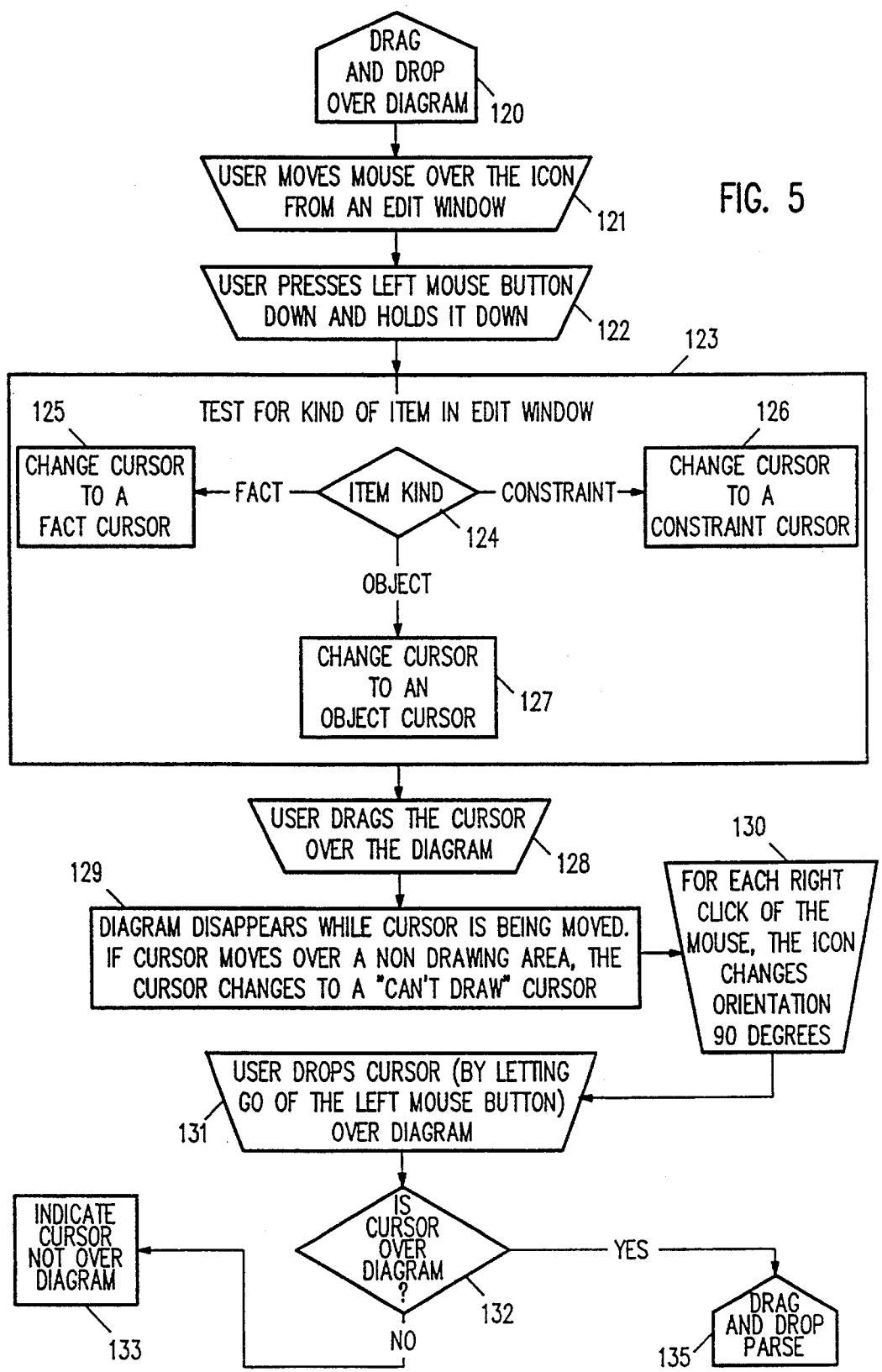
FIG. 5 is a flow chart illustrating the Drag and Drop over Diagram function of the Fact Compiler of the present invention.

Drag and Drop over Diagram function 120, is detailed in FIG. 5. After the user selects Drag and Drop over Diagram at 120, the user utilizing a mouse moves a pointer over the icon from the edit window at 121. The user presses the left mouse button down and holds it down at 122. The system will test for the type of item which was input in the edit window at 123. Item kind selector 124 will change the nature of the cursor depending upon the type of information input in the edit window. If the data input is a fact, the cursor will change to a fact cursor at 125. If the data input is a constraint, the cursor will be changed to a constraint cursor at 126. If the data input is an object, the cursor will change to an object cursor at 127. The user drags the modified cursor over the diagram at 128. The edit window will disappear while the cursor is being moved. If the cursor moves over a non-drawing area the cursor change to a "Can't Draw" cursor. In the event the user needs to reorient the direction of the data which is input, the right mouse button is used. For each click of the right mouse button, the icon changes its orientation 90° at 130. When the user releases the left mouse button at 131, the cursor will drop the data text over the diagram. Cursor checker 132 determines if the cursor is actually over the diagram or not. If it is, Drag and Drop Parse function 135 is invoked. If not, an indication is given the user that the cursor is not in the diagram.

Figure 6:
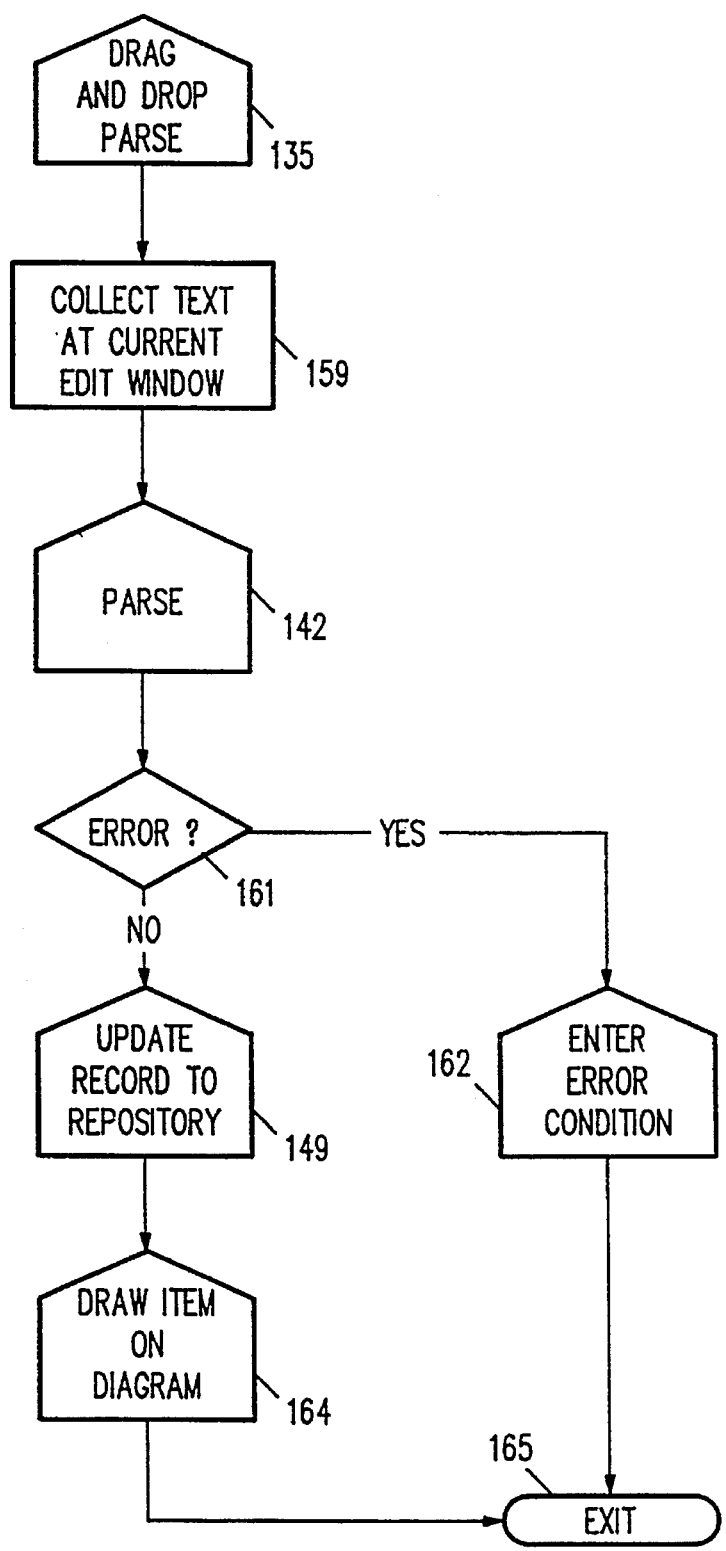
FIG. 6 is a flow chart of the Drag and Drop Parse function invoked by the Drag and Drop over Diagram function.

Drag and Drop Parse function 135 is detailed in FIG. 6. After collecting text at the current edit window, the text is parsed using Parse function 142. After parsing an error checker 161 determines if an error has been made in the textual input. If no error has been made, the record is updated to the repository using the Update Record to Repository function 149. After the record has been updated to the repository, the item is drawn on the diagram using Draw Item on Diagram function 164. At error checker 161, should an error condition be determined to exist, Enter Error Condition function 162 is invoked and function 135 exited at 165.

Referring again to FIG. 4, function 140 gives the user the option of compiling the input into the repository only. Function 140 is detailed in FIG. 7. After selecting function 140, Compiling into Repository Only, the system combines all text from the edit windows at 141 and parses the input data using Parse function 142. Error checker 143 determines if an error has been made in the textual input. If errors have been made, they are shown at error window 145. In the event no errors were incurred, successful compilation is shown in the status bar at 144. An iterative process is detailed at 146. Each of the lists generated, the object list, fact list and constraint list, is searched record by record. Each record is retrieved from it's respective list at 147 and its status tested at 148. In the event the record has been changed, function 149, which updates the record to the repository, is invoked. In the event the record has not been changed, the list pointer is incremented at 150 and a new record is retrieved from the list. In the event the record is new, function 149 is again invoked after which the record type is tested at 152. If the new record is an object, function 152, which allocates a new object, is invoked. In the event the new record is a fact, a new fact is allocated using function 154. If the new record type is a constraint, a new constraint is allocated at 155. Following any of these allocations, the list pointer is again incremented at 150.

Figure 7:
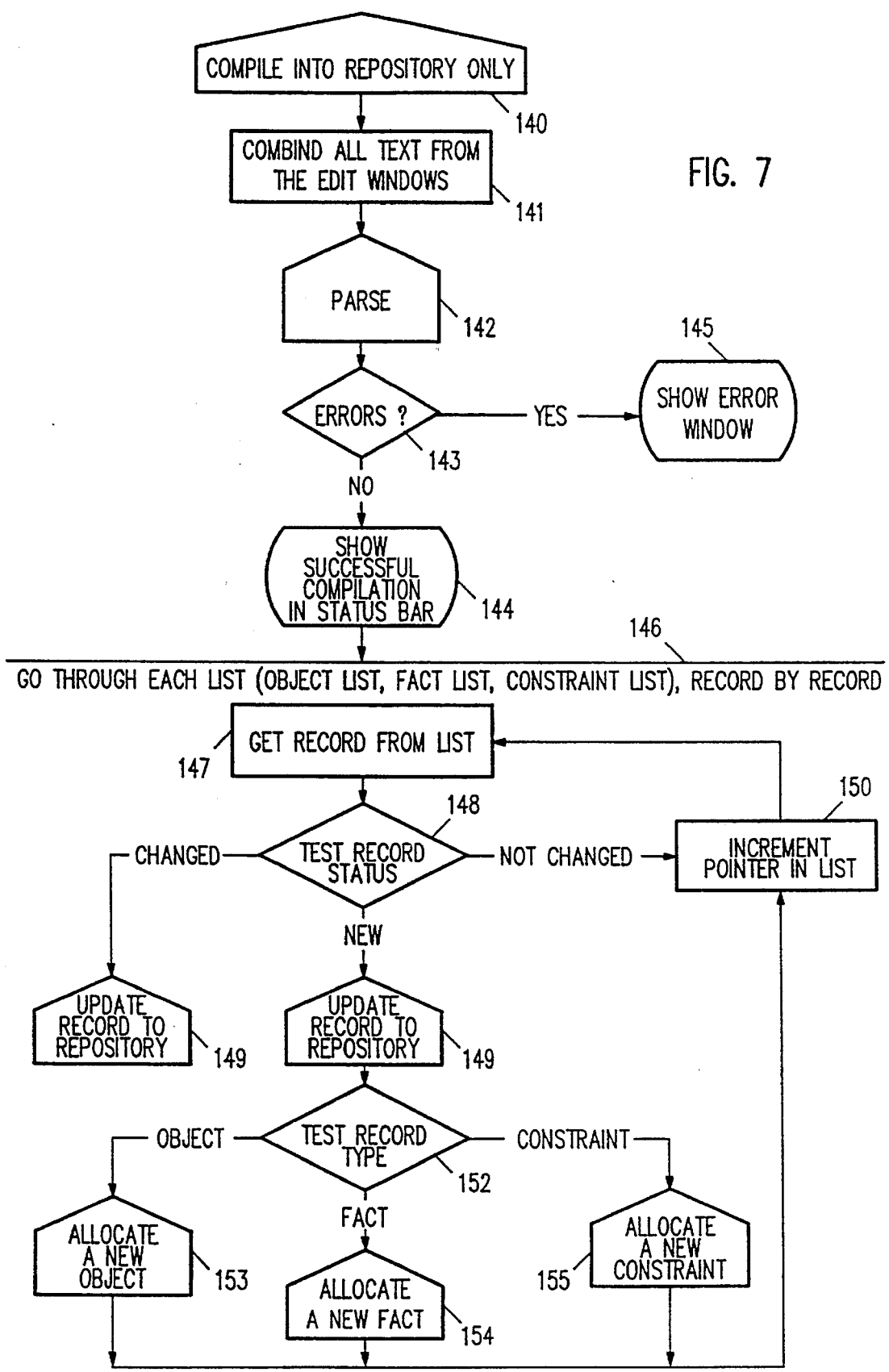
FIG. 7 is a flow chart of the Compile into Repository Only function invoked by the Fact Compiler.
Figure 8:
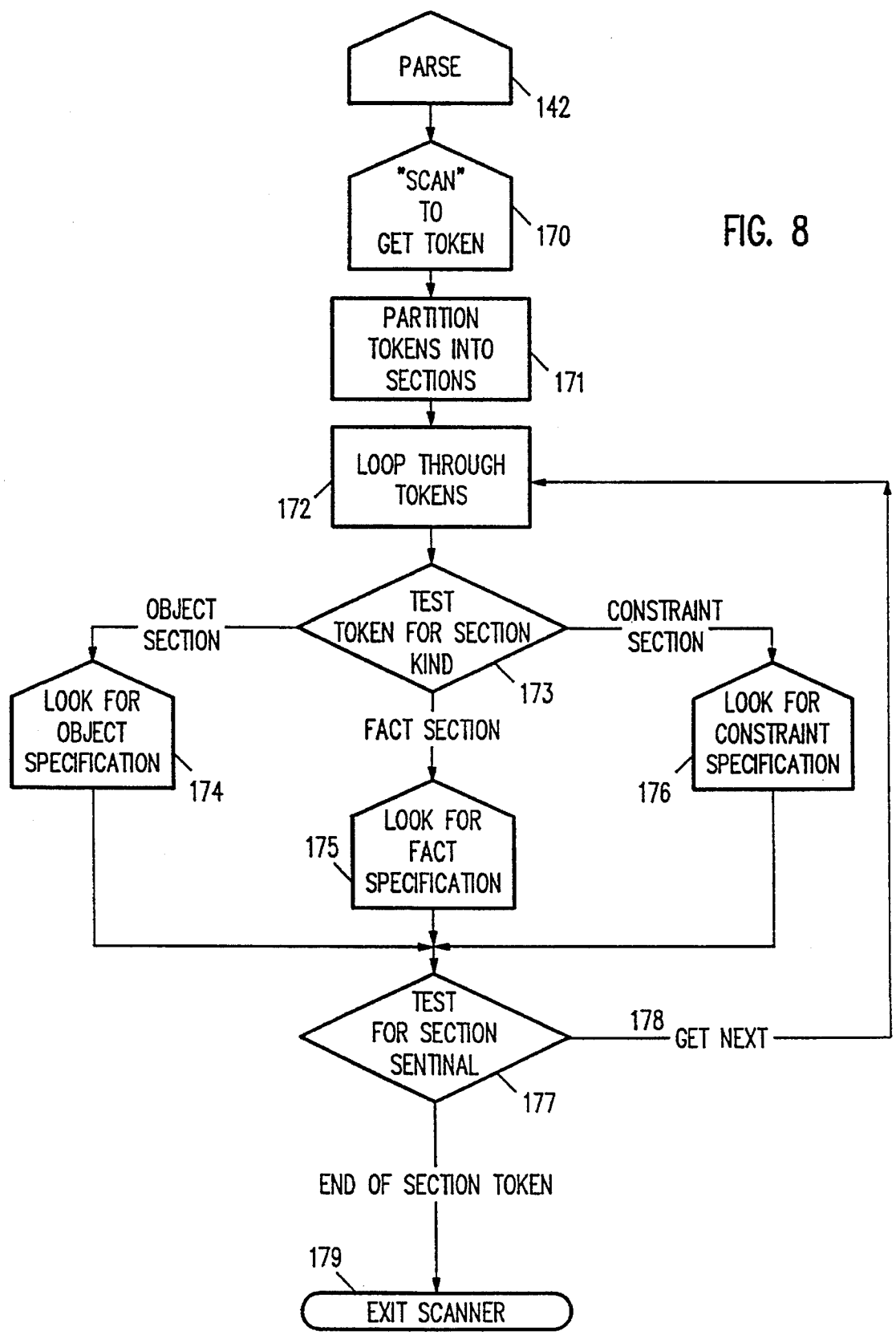
FIG. 8 is a flow chart of the Parse function invoked by the Compile into Repository Only function.

Parse function 142 of FIGS. 6 and 7 is detailed at FIG. 8. After Parse function 142 is invoked, it invokes Scan function 170 to retrieve a token. After the token is retrieved, it is partitioned into sections at 171. An iterative loop through each of the tokens is set up at 172. Each token is tested for its type at 173. In the event the section is an object, function 174, which looks for object specifications, is invoked. In the event the section is a fact, function 175, which looks for fact specifications is invoked. In the event the section being tested is a constraint, function 176 is invoked which looks for constraint specifications. After either functions 174, 175 or 176 have been invoked, a test is made to determine if the section tested is the terminal section. If not, the next section is subjected to the same test. In the event the section is a terminal section, Parse function 142 is exited at 179.

Figure 9:
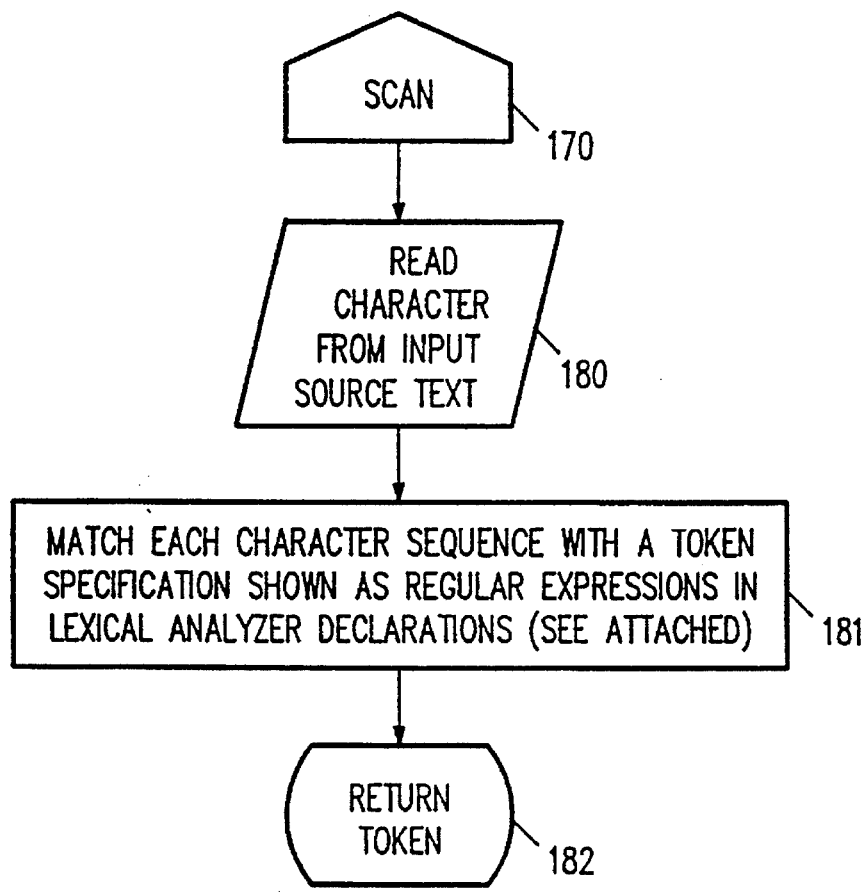
FIG. 9 is a flow chart of the Scan function invoked by the Parse function.

Scan function 170 of FIG. 8 is detailed at FIG. 9. After Parse function 142 invokes Scan function 170, it reads characters from the input source text at 180. At 181, the function matches each character sequence with a token specification shown as regular expressions in the Lexical Analyzer Declarations at 181, after which the token is returned at 182.

Figure 10:
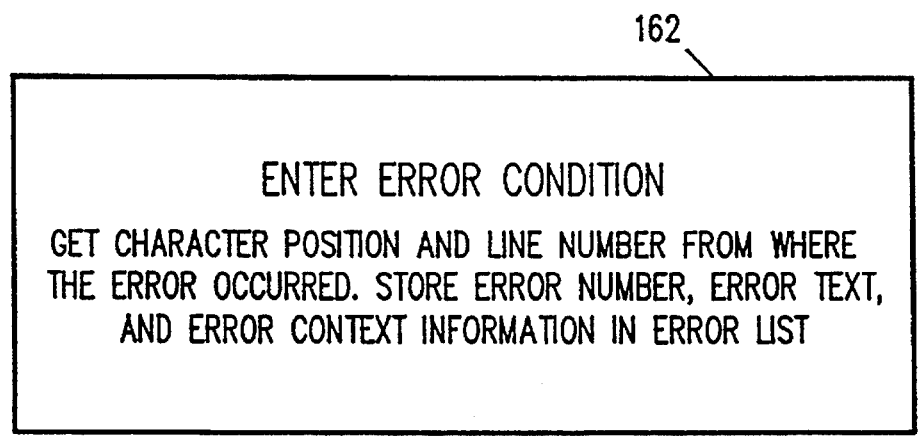
FIG. 10 is a table indicating the procedure for entering an error condition according to the present invention.

Function 162, Enter Error Condition which was previously invoked at FIG. 6, is detailed at FIG. 10. For each error encountered, the system will retrieve the character position and line number where the error occurred. This function will then store the error number, error text and error context information in an error list.

Figure 11:
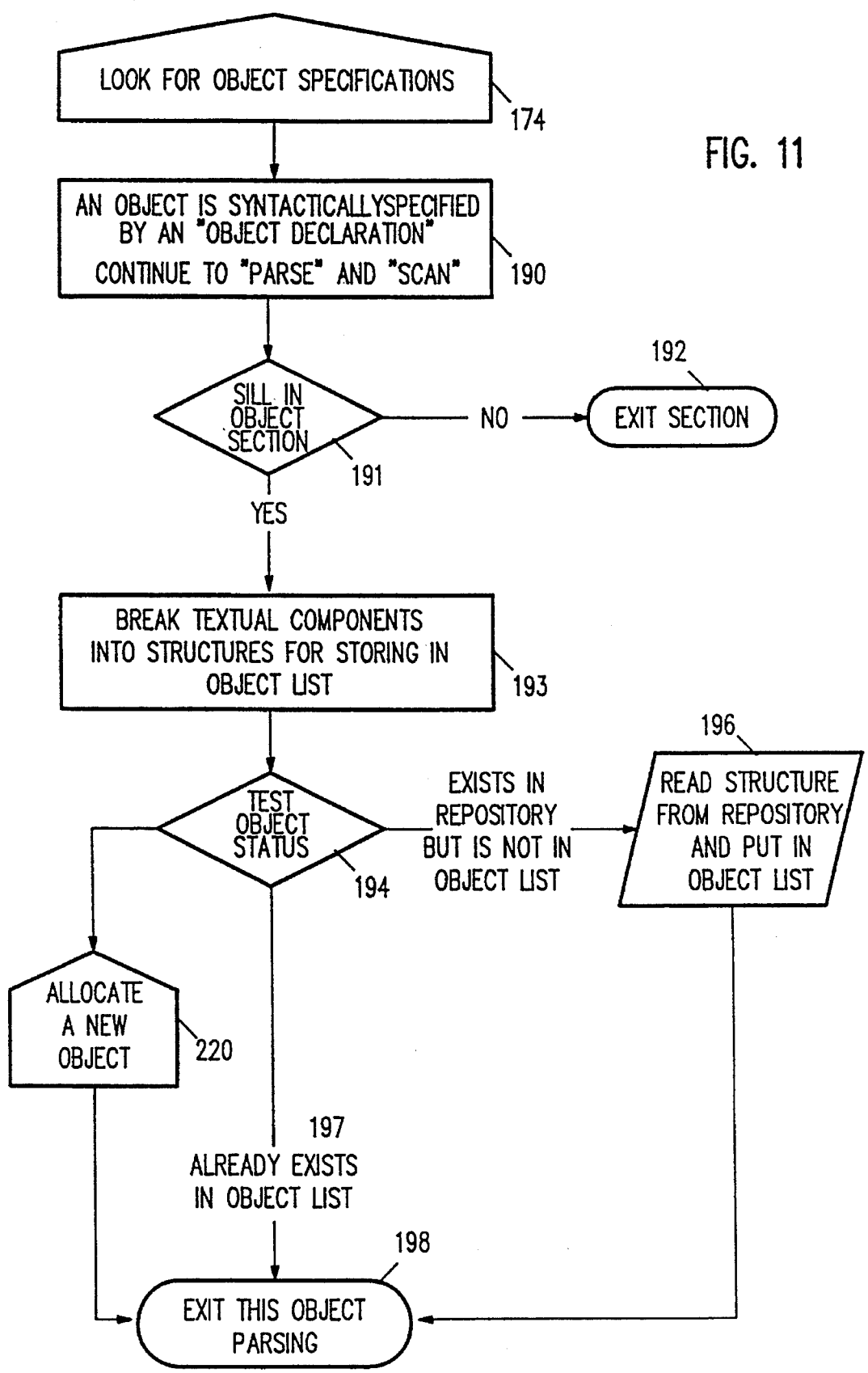
FIG. 11 is a flow chart illustrating the Look for Object Specifications function invoked by the Parse function.

Referring again to FIG. 8, function 174, Look for object Specification, is detailed at FIG. 11. When function 174 is invoked, the object is syntactically specified by any "Object Declaration" at 190. The function continues to "parse" and "scan". A determination is made at 191 as to whether it is still an object section. If not, the function exits at 192. If the object is still in the object section, it breaks the textual components into structures for storing in the object list at 193. At 194, the object status is tested. If it is a new object, function 220 which allocates a new object, is invoked, If the object already exists in an object list, function 174 is exited at 198. If the object exists in the repository but it is not in the object list, the system reads the structure at 196 from the repository and puts it in the object list. After either function 196 or 220 is invoked, the function is again exited at 198.

Figure 12:
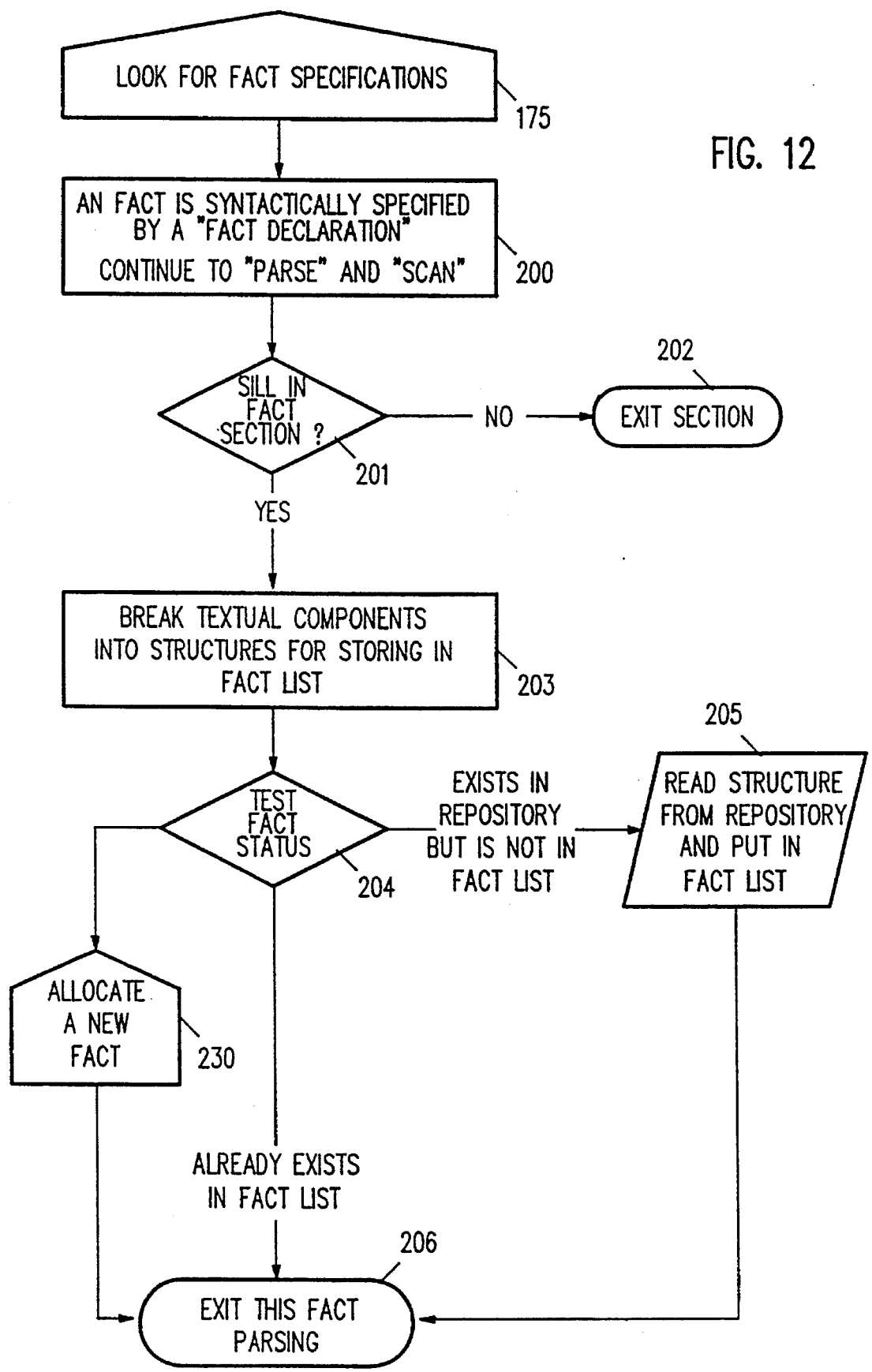
FIG. 12 is a flow chart representing the Look for Fact Specifications function invoked by the Parse function.

Function 175, Look for Fact Specification, previously invoked at FIG. 8, is detailed in FIG. 12. After function 175 is invoked, the fact is syntactically specified by a "fact declaration". The system continues to "parse" and "scan". A determination is made at 201 as to whether the fact is still in the fact section. If not, function 175 is exited at 202. If it is still in the fact section, the system breaks the textual components into structures for storing in a fact list at 203 after which the fact status is tested at 204. If the fact is a new fact, function 230 is invoked, which allocates a new fact after which fact parsing is exited at 206. If the fact already exists in a fact list, the function 175 again exits at 206. If the fact exists in the repository but is not in the fact list, the system reads the structure at 205 from the repository and puts it in the fact list, after which function 175 exits once again at 206.

Figure 13:
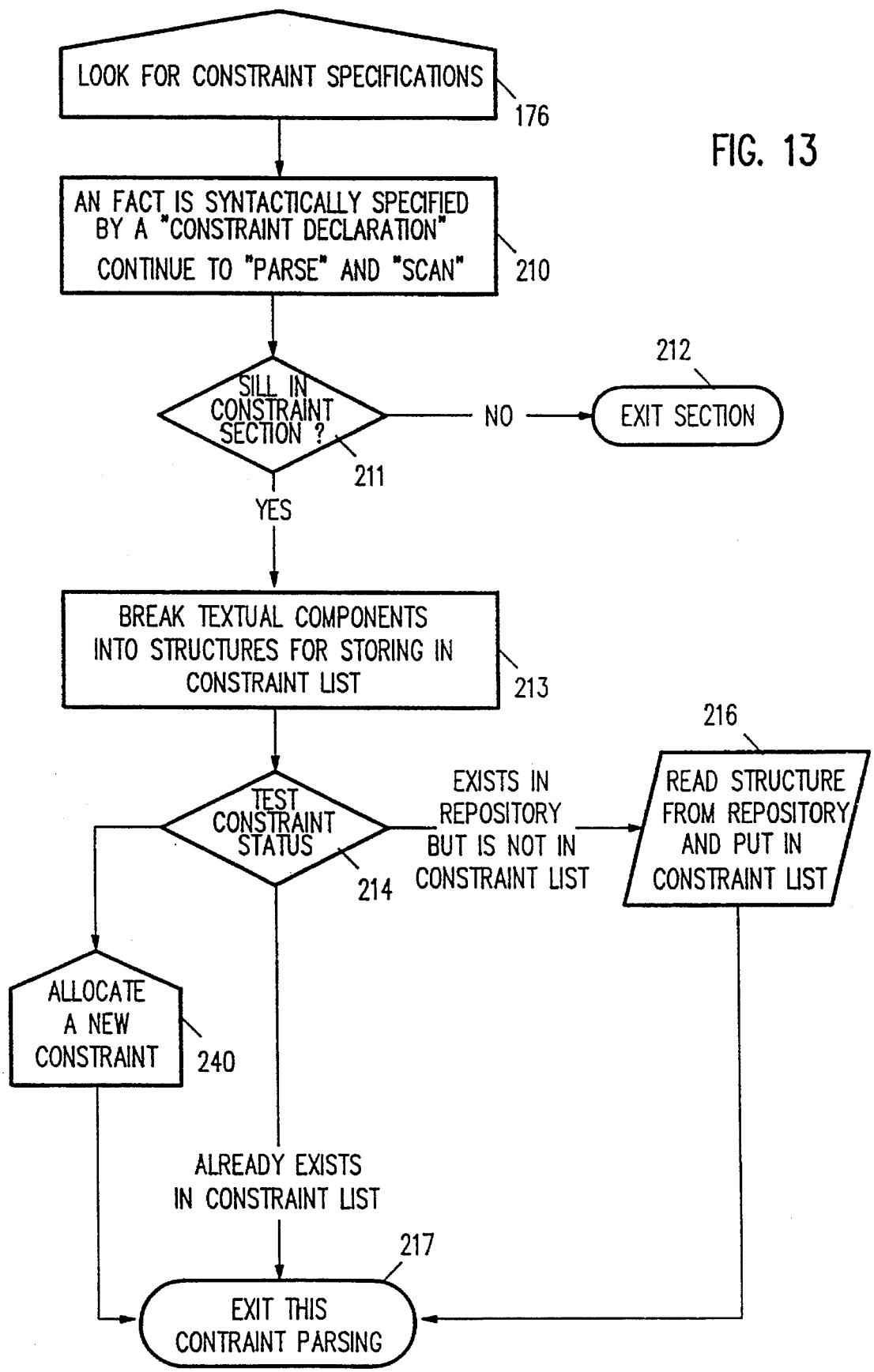
FIG. 13 is a flow chart representing the Look for Constraint Specifications function invoked by the Parse function.

Function 176, also previously invoked at FIG. 8, is detailed at FIG. 13. When function 176 is invoked to look for constraint specifications, a constraint is syntactically specified by a "constraint declaration" at 210. The system continues to "parse" and "scan". At 211 a determination is made if the constraint is still in the constraint section. If not, function 176 is exited at 212. If the constraint is still in the constraint section, the system breaks the textural components into structures for storing in the constraint list at 213. After which the constraint status is tested at 214. If a new constraint, function 240 is invoked, which allocates a new constraint. If the constraint already exists in the constraint list, function 176 is exited at 217. If the constraint exists in the repository but it is not in the constraint list, the function reads the structure from the repository and puts it in the constraint list at 216. After either function 240 or process 216 is accomplished, function 176 exits at 217.

Figure 14:
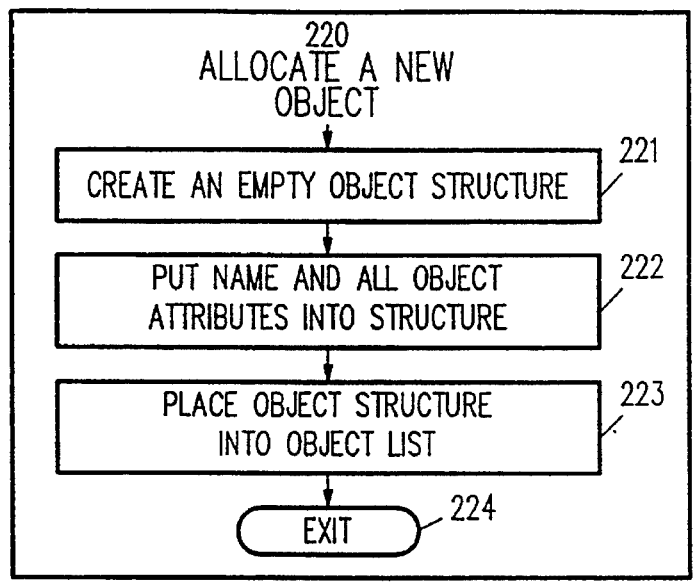
FIG. 14 is a flow chart illustrating the Allocate a New Object function invoked by the Look for Object Specifications function.

Function 220, previously invoked in FIG. 11, is detailed in FIG. 14. Function 220 creates an empty object structure at 221, enters the name and all object attributes into the structure at 222, places the object structure in the object list at 223, and exits at 224.

Figure 15:
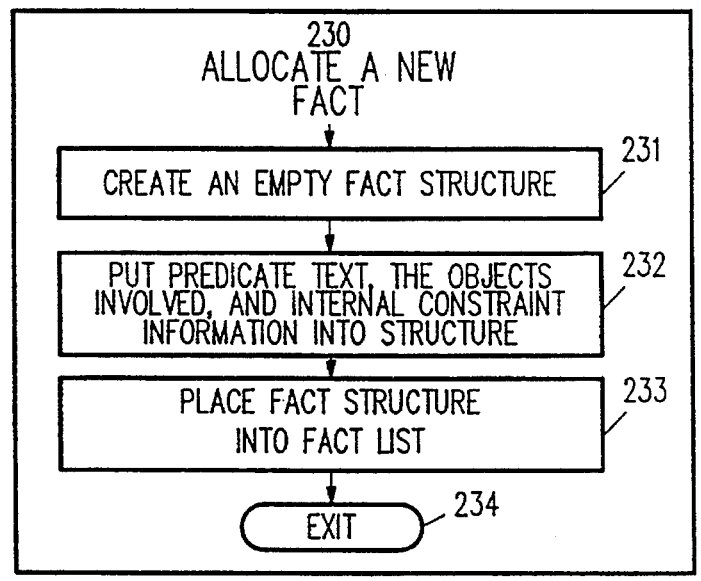
FIG. 15 is a flow chart illustrating the Allocate a New Fact function invoked by the Look for Fact Specifications function.

Function 230, previously invoked in FIG. 12, is detailed in FIG. 15. Function 230 creates an empty fact structure at 231. At 232 the function puts the predicate text, the objects involved and internal constraint information into the structure. At 233, the function places the fact structure into the fact list and exits at 234.

Figure 16:
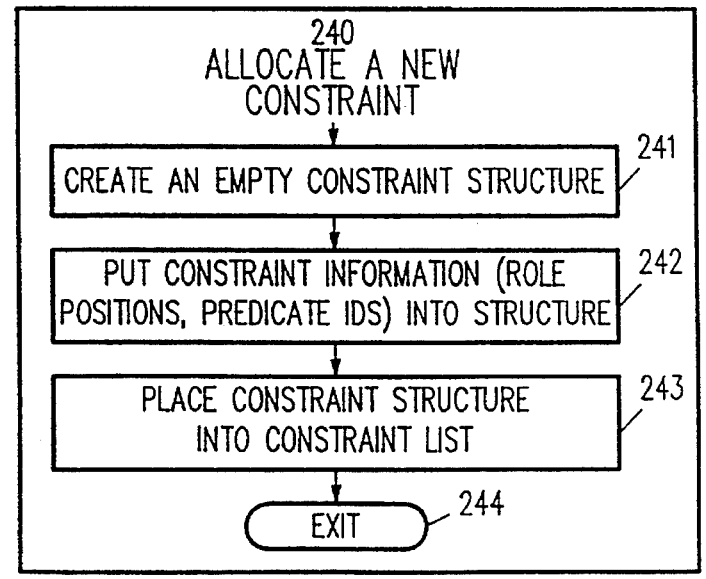
FIG. 16 is a flow chart illustrating the Allocate a New Constraint function invoked by the Look for Constraint Specifications function.

Function 240, previously invoked at FIG. 13, is detailed in FIG. 16. Function 240 allocates a new constraint as follows: it creates an empty constraint structure at 241. At 242 it puts the constraint information (role positions, predicate IDs) into the structure. At 243 the function places the constraint structure into the constraint list and exits at 244.

Figure 17:
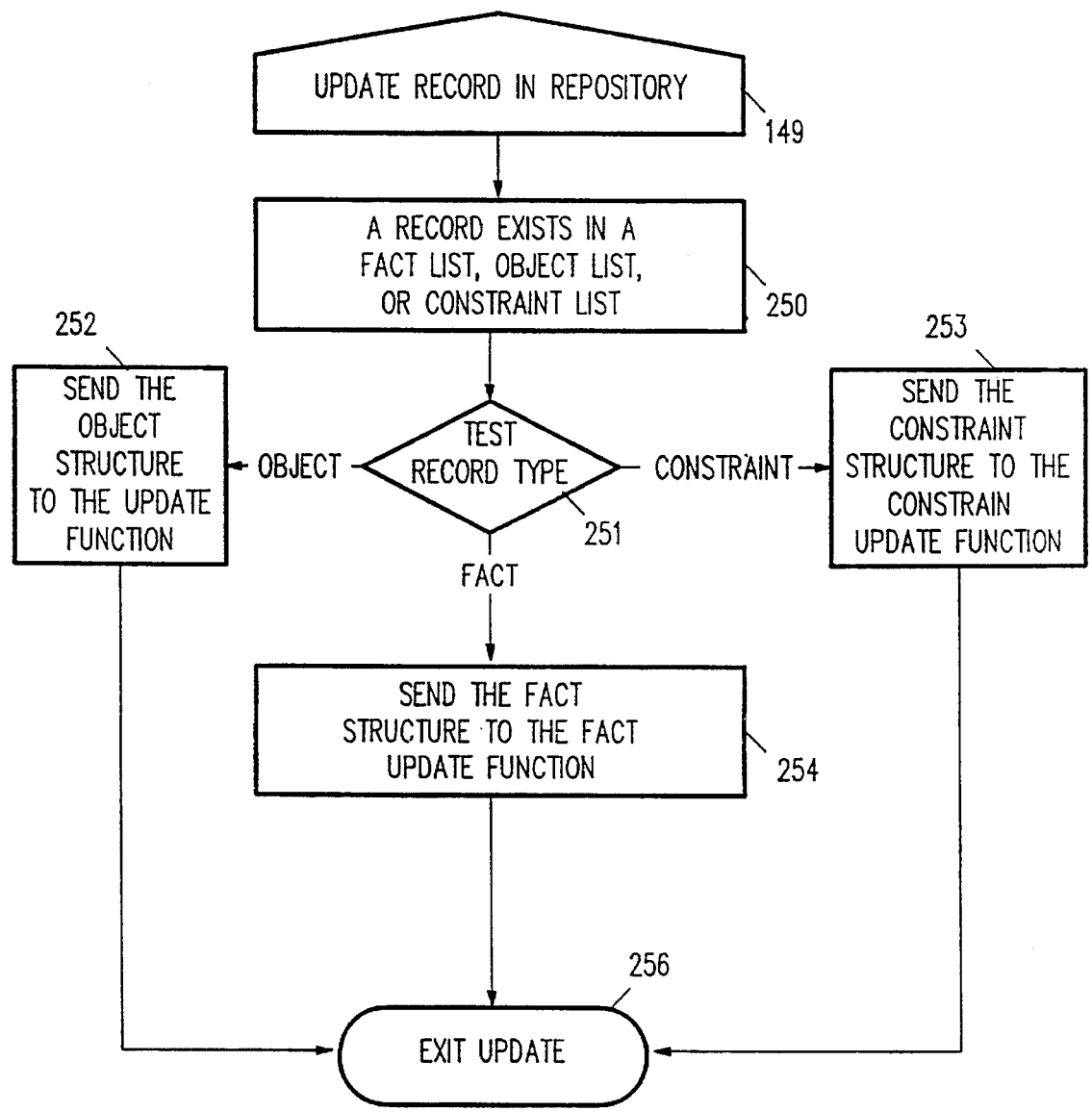
FIG. 17 is a flow chart representing the Update Record in Repository function invoked by both the Drag and Drop Parse and Compile into Repository Only functions.

Function 149, previously invoked in both FIGS. 7 and 8, is detailed in FIG. 17. After function 149 is invoked, an updated record exists in a fact list, an object list or a constraint list, as shown at 250. At 251, the record type is tested. If the record is an object, the object structure is sent the object update function at 252. If the record is a fact, the fact structure is sent to the fact update function at 254 and if a constraint structure is sent to a constraint update function at 253. After any of the aforementioned update functions is accomplished, function 149 is exited at 256.

Fact Tree Formation

Figure 18:
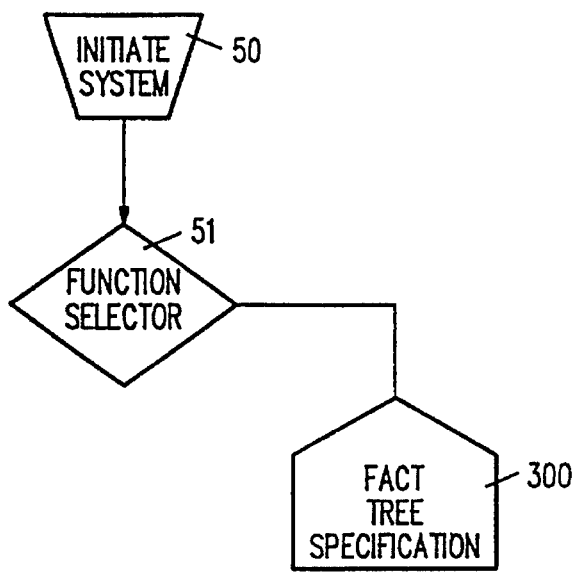
FIG. 18 is a flow chart illustrating the initial selection menu of the present invention, after selecting Fact Tree Specification according to the present invention.
Figure 19:
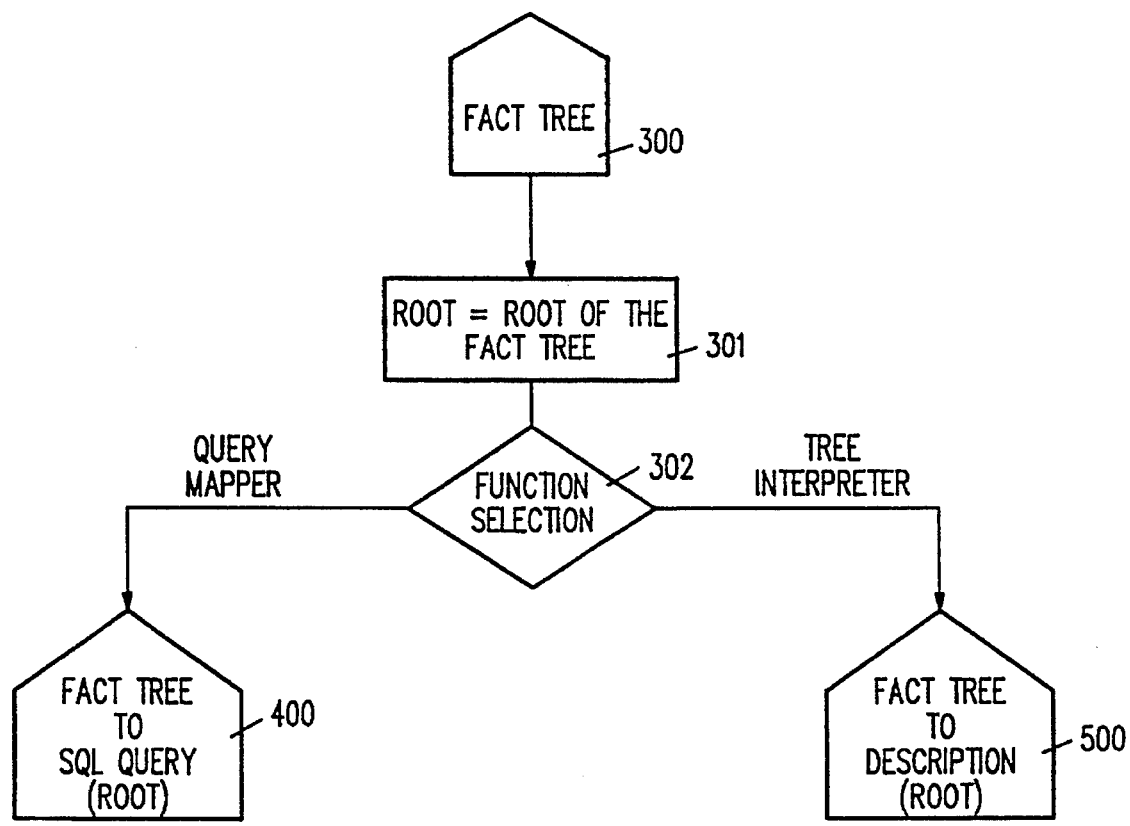
FIG. 19 is a flow chart illustrating the Fact Tree Formation function and selection of either the Query Mapper or Tree Interpreter functions of the present invention.

Referring to FIG. 18, the second option possible from function selection 51 is initiation of Fact Tree Specification 300, which is detailed at FIG. 19.

Referring to FIG. 19, the fact-tree is formed at 300. An example of a fact tree is:

---

-- Person ( = Mr Smith ) . . . . . . . . . . . . . . . . . . . . . . . . restriction
   | -- that person lives at an address
   | -- that has a phone number . . . . . . . . . . . . . . . . . . . . . . . . . noun
   | -- that studies a subject
                             | -- that is taught by a Person
                                     | . . . . . . phrase
Each node in the fact tree has a noun (e.g. Person).
Each node in the fact tree may have a restriction (e.g. = Mr Smith).
Each non-root node in the fact tree (all but the very top node) has a phrase (e.g. is taught by).

---

The root of the tree is then assigned to the variable Root at 301. In this case, the shaded node (Person) is assigned to Root.

If the fact tree is to be mapped to an SQL query, Root is passed as the parameter to the function Fact_Tree_To_

SQL 400. The return value of this function will be an SQL query. Fact_Tree_To_SQL is described using functions 400 to 465.

If the fact tree is to be mapped to an English description, Root is passed as the parameter to the function Fact_Tree_To_Description (500). This function has no return value. The result of Fact Tree To Description will be to print out the description of the tree. Fact_Tree_To_Description is described using functions 500 to 535.

more children to process), this instantiation of Fact_Tree_To_Description is complete (507–508) otherwise, Fact_Tree_To_Description is invoked for Child[i] at 509, I is incremented at 510 and the loop continues (507) until there are no more children to process.

The result of Fact_Tree_To_Description applied to the Person node in the example tree would be:

```
Output
For all Person(s) (where Mr. Smith) show:         the Address that the Person lives at
    the Subjects that the Person studies,         the Phone Number that the Person has
    and for those subjects show:                  Processing
        The Person(s) that the Subject Fact_Tree To .Description called on Person
        is taught by
                                                  Fact_Tree To .Description called on
                                                  that lives at Address
                                                  Fact Tree To .Description called on
                                                  that has phone number
                                                  Fact_Tree To .Description called on
                                                  that studies subject
                                                      Fact Tree To Description called on
                                                      that Is taught by Person
```

Tree Interpreter

Figure 25:
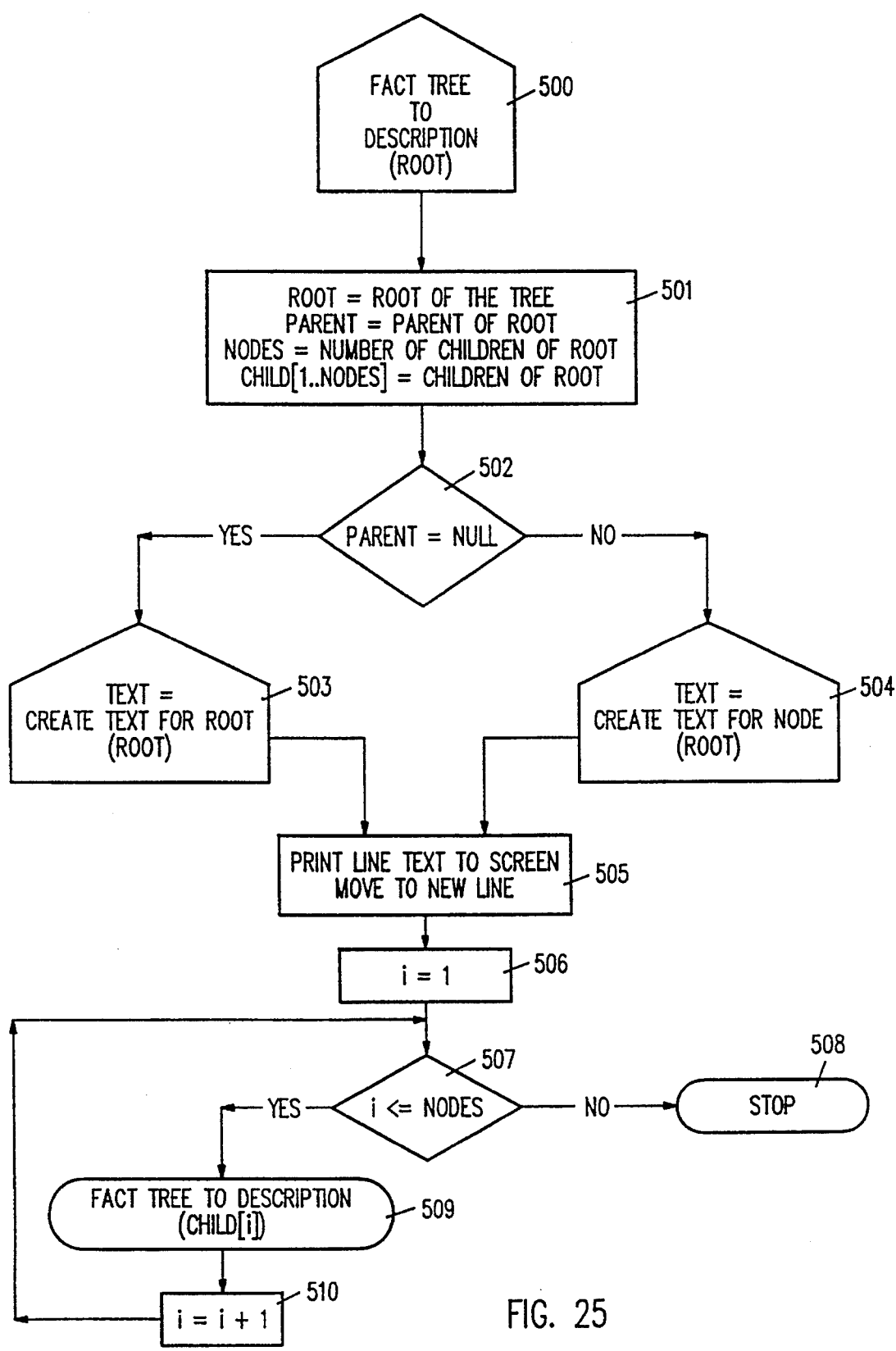
FIG. 25 is a flow chart of the Fact Tree to Description function invoked when a user selects the Tree Interpreter of the present invention.
Figure 26:
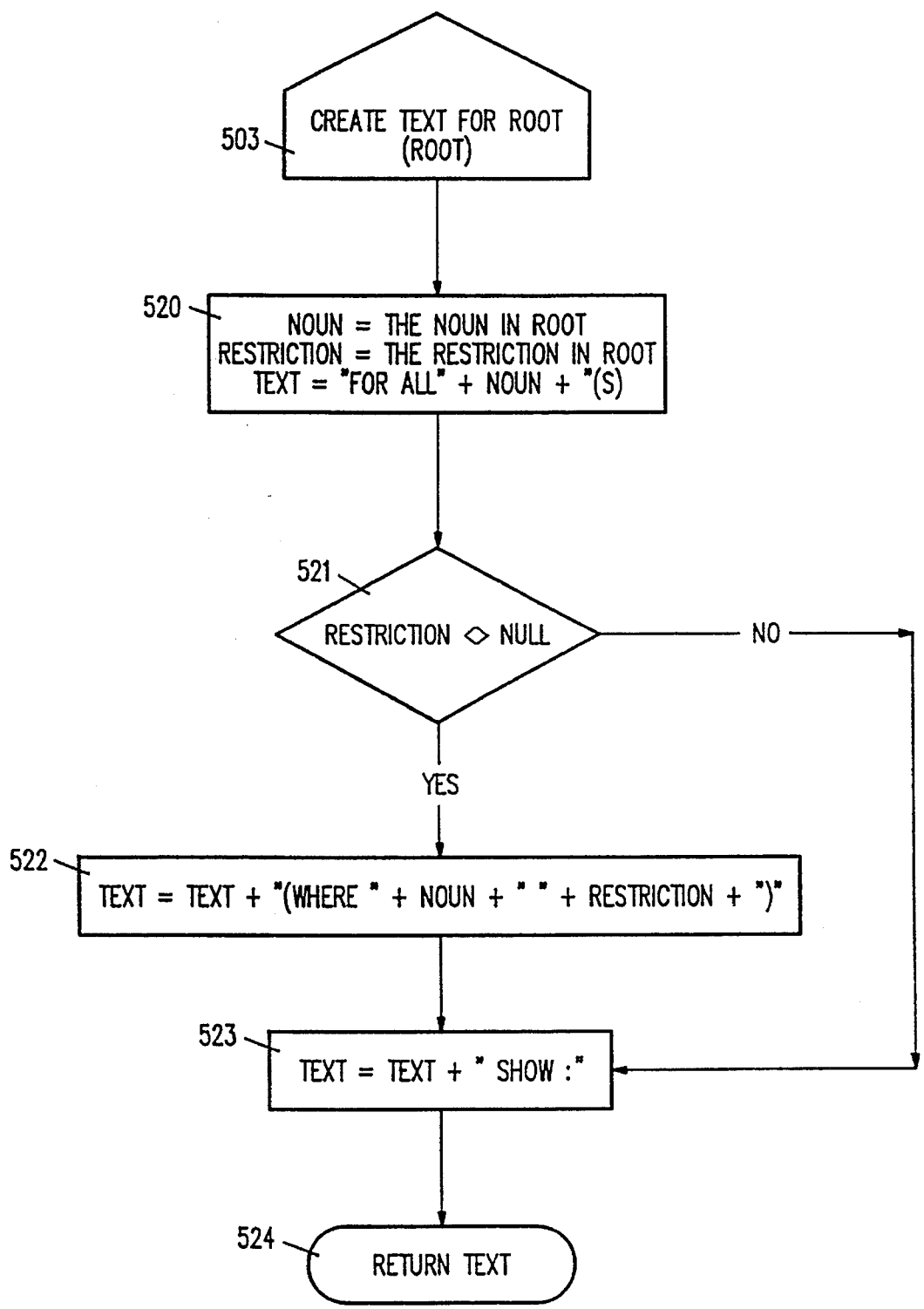
FIG. 26 is a flow chart of the Create Text for Root function invoked by the Fact Tree to Description function.

The present invention also provides a Tree Interpreter, invoked as "Fact_Tree_to_Description", a detailed description of which follows. Referring to FIG. 25, Fact_Tree_To_Description (500) is a recursive function that takes a node of a fact tree as input and returns a description of the query represented by that tree or sub-tree. The parameter Root is the node on which the function is to operate.

Function 501 assigns some working variables. Root is the root of a tree of subtree that may or may not contain a parent and may or may not contain children. For example, if the shaded node in the example tree (Parent) was passed to Fact_Tree_To_Description, there would be no parent, and three children. Parent is assigned Root's parent (in this case NULL). Nodes is assigned the number of Root's children (three). Child [i . . . Nodes] is an array which is assigned Root's children (the three children of Person—"that lives at Address", "that has a phone number", and "that studies a subject".

Next, the temporary variable Text is assigned the "description" of the Root. (502–504). If Root has no parent (it is the root of the fact tree), the Root is passed to the function 503 Create_Text_For_Root (503), otherwise Root is passed to Function 507, Create_Text_For_Node. The return value of both of these functions is the description of Root.

At 505, Text is then printed out followed by a carriage return. If Root referred to the Person node, Function 503, Create Text For Root would have been used and Text would be "For all Person(s) (where Person= Mr. Smith) show:" If Root referred to the "that studies Subject" node, function 504, Create Text For Node would have been used and Text would be "the Subject(s) that the Person studies, and for those Subject(s) show:".

The next step is to recursively process Root's children using a depth-first-search algorithm, detailed in functions 505–510. Nodes is the number of Root's children and Child [i . . . Nodes] are Root's actual children.

The variable I is used as a counter variable. It is initially assigned to 1 at 506. If I is greater than Nodes (there are no Function 503, is invoked in FIG. 25 and Create_Text_For_Root, takes the root node of a fact tree as an argument (Root) and returns the description of that node.

At 520, Root contains a noun (e.g. Person); this is assigned to Noun. Root may also contain a Restriction (e.g. = Mr. Smith); this is assigned to Restriction. The variable Text is assigned 'For all' + noun+ '(s)' (e.g. 'For all Person(s)').

If Root contains a Restriction, that restriction is added to Text at 521 and 522. (e.g. Text= "For all Person(s)(where Person= Mr. Smith)")

"show": 'is added to Text at 523 and

Text is returned at 524 (e.g. Text= "For all Person-(s)(where Person= Mr. Smith) show:").

Figure 27:
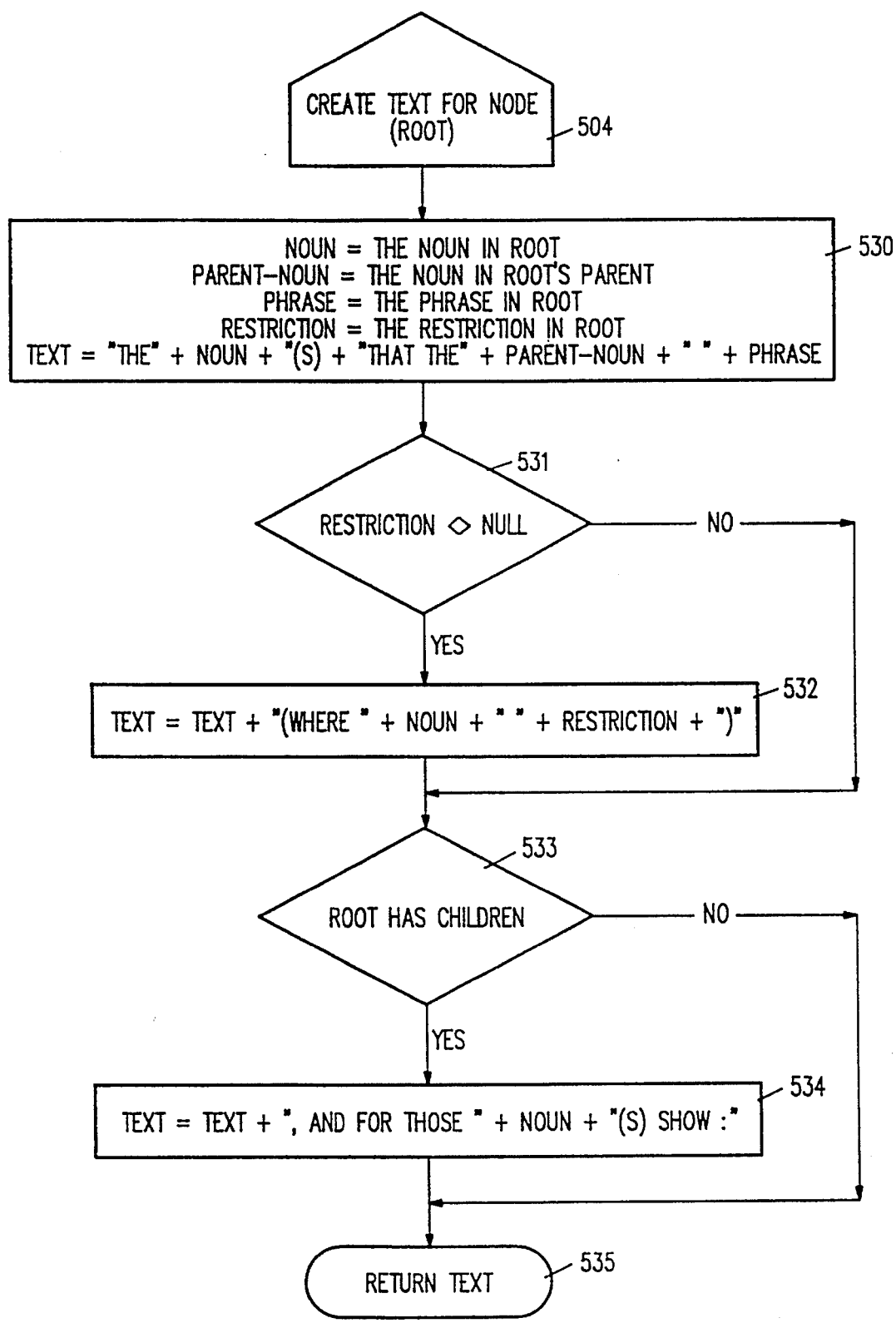
FIG. 27 is a flow chart illustrating the Create Text for Node function invoked by the Fact Tree to Description function.

Referring back to FIG. 25, Create_Text_For_Node (504), which takes a non-root node of a fact tree as an argument (Root) and returns the description of that node is detailed at FIG. 27. For example, the node 'that studies a Subject' could be passed as an argument.

At 530 Root contains a noun (e.g. Subject), this is assigned to Noun. Root contains a phrase (e.g. 'studies') this is assigned to Phrase. Root's parent contains a noun (e.g. Person), this is assigned to Parent-Noun. Root may also contain a Restriction (e.g. = Mr. Smith) this is assigned to Restriction. The variable Text is assigned 'the'+ noun+ '(s) that the'+ Parent-Noun+ ' '+ Phrase (e.g. 'the Subject(s) that the Person studies').

If Root contains a Restriction, that restriction is added to Text at 531 and 532.

If Root has children', and for those'+ Noun+ ':(s) show:' is added to Text at 533 and 534.

At 535, Text is returned (e.g. Text= 'the Subject(s) that the Person studies, and for those Subject(s) show:').

Query Mapper

Figure 20:
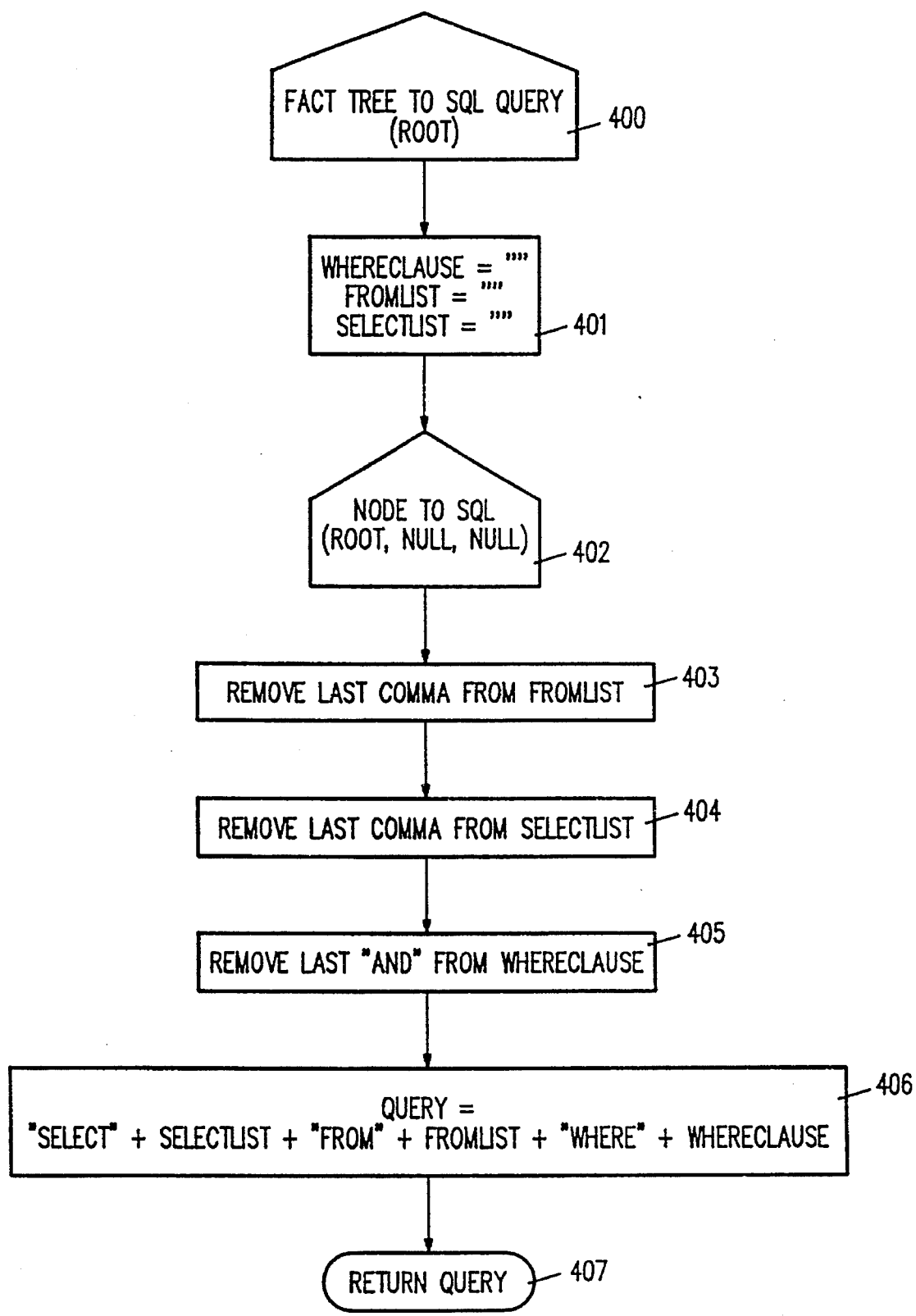
FIG. 20 is a flow chart representing the Fact Tree to SQL Query function invoked when a user selects the Query Mapper function of the present invention.

The present invention also provides a Query Mapper, invoked as "Fact_Tree_to_SQL_Query", a detailed description of which follows. Referring back to FIG. 19, function 400 is detailed at FIG. 20. This function takes the root node of a fact tree as input and returns an equivalent SQL query. The parameter Root is the root of the tree on which the function is to operate.

Each non-root node in the fact tree (all but the very top node) has a relational mapping associated with it. The relational mapping specifies the node's representation in a relational database. By way of example, for an example set of facts:

Person lives at address

Person has Phone Number

Person studies Subject

Subject is taught by Person if the relational database associated with an example fact tree is:

Person_Table: (Person, Address)

Phone_Table: (Person, Phone Number)

Studies_Table: (Person, Subject Studied)

Subject_Table: (Subject, Teacher Person)

The associated RMAP mappings would be:

| FACT | TABLE | FIRST NOUN COLUMN | SECOND NOUN COLUMN |
|---|---|---|---|
| Person lives at address | Person_Table | Person | Address |
| Person has Phone Number | Phone_table | Person | Phone Number |
| Person studies Subject | Studies_Table | Person | Subject Studies |
| Subject is taught by Person | Subject_Table | Person | Teacher Person |

Table denotes the table in which the fact is stored. First Noun Column denotes the column for the node's parent. Second Noun Column denotes the column for the node's noun.

For example, the mapping associated with (Person) lives at Address means that all addresses are stored in the Person Table table, with the people who live at them in the Person column and the actual addresses in the Address column.

The predicate mappings are derived by an algorithm similar to the one described in McCormack & Halpin, Automated Mapping of Conceptual Schemas to Relational Schemas, Proc CAiSE 93, Sorbonne University, Paris, 1993.

An SQL query contains three parts, a SelectList, a From List, and a WhereClause. These are gradually build up using recursive calls to Node_To_SQL.

Initially, SelectList, FromList, and WhereClause are set to the empty string (" ") at 401.

At 402, Node_To_SQL is called, with Root as its parameter, to build up the query.

At 403, 404 and 405, SelectList, FromList, and WhereClause are respectively formatted. At 406, the query is assembled as the result of the function and returned at 407.

Node_To_SQL is invoked at 402. This is a recursive function that maps a node of a fact tree into an SQL query. Successive calls to this function build up the SelectList, FromList, and WhereClause variables.

Node_To_SQL has three parameters. The first, Root, is the root of the tree or sub tree being mapped. The second and third parameters are the table and column used to join the query for Root's sub tree to the rest of the query.

At 410, Parent is the parent of Root, Nodes is the number of children of Root and Child [i . . . Nodes] are the children of Root.

If Root has no children, no processing is required so the function simply returns (411, 412).

Otherwise, the children of Root are added to the query as follows:

If Root has a parent, it needs to be joined into the query using the JoinTable and JoinColumn function 413 and 414; and Root needs to be added to the select list of the query at 415.

Figure 22:
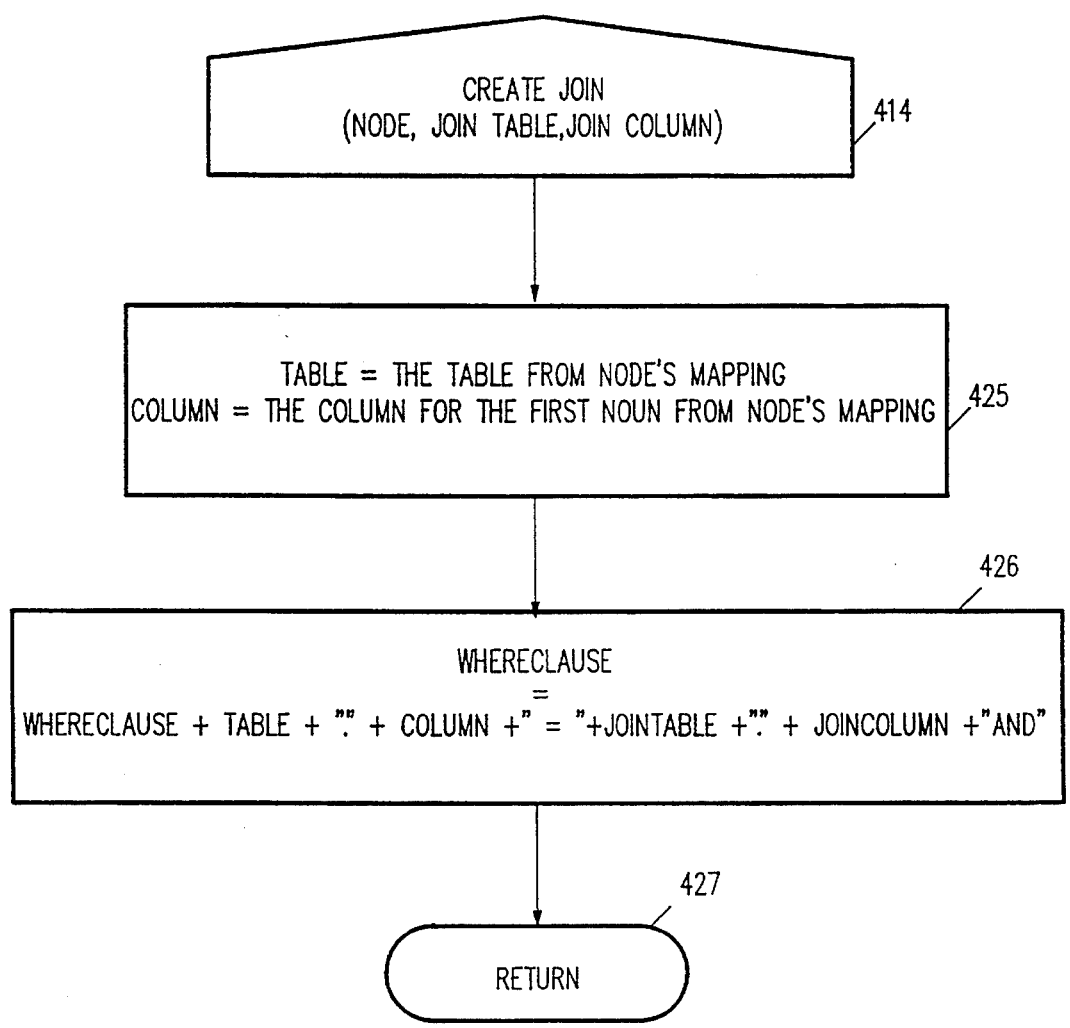
FIG. 22 is a flow chart representing the Create Join function invoked by the Node to SQL function.

To join all of Root's children into the query, they are processed sequentially as follows: The counter variable i is initialized to 1 at 416. The value of nodes is checked at 417, and if i is less than nodes Add_Selector_2 (node) is invoked at 419. Each child is added to the select-list using Add_Selector_2 at 419, and that child's children are added into the query using recursive calls to function 421, Node_To_ SQL. The selector for each node is used to join the subtree's queries together at 420. Create_Join, invoked at 414 is detailed at FIG. 22. This function joins a subquery to the main query by adding an inner join to the where-clause. The join is based in the first noun in the passes node (Node) and the passed parameters.

Figure 21:
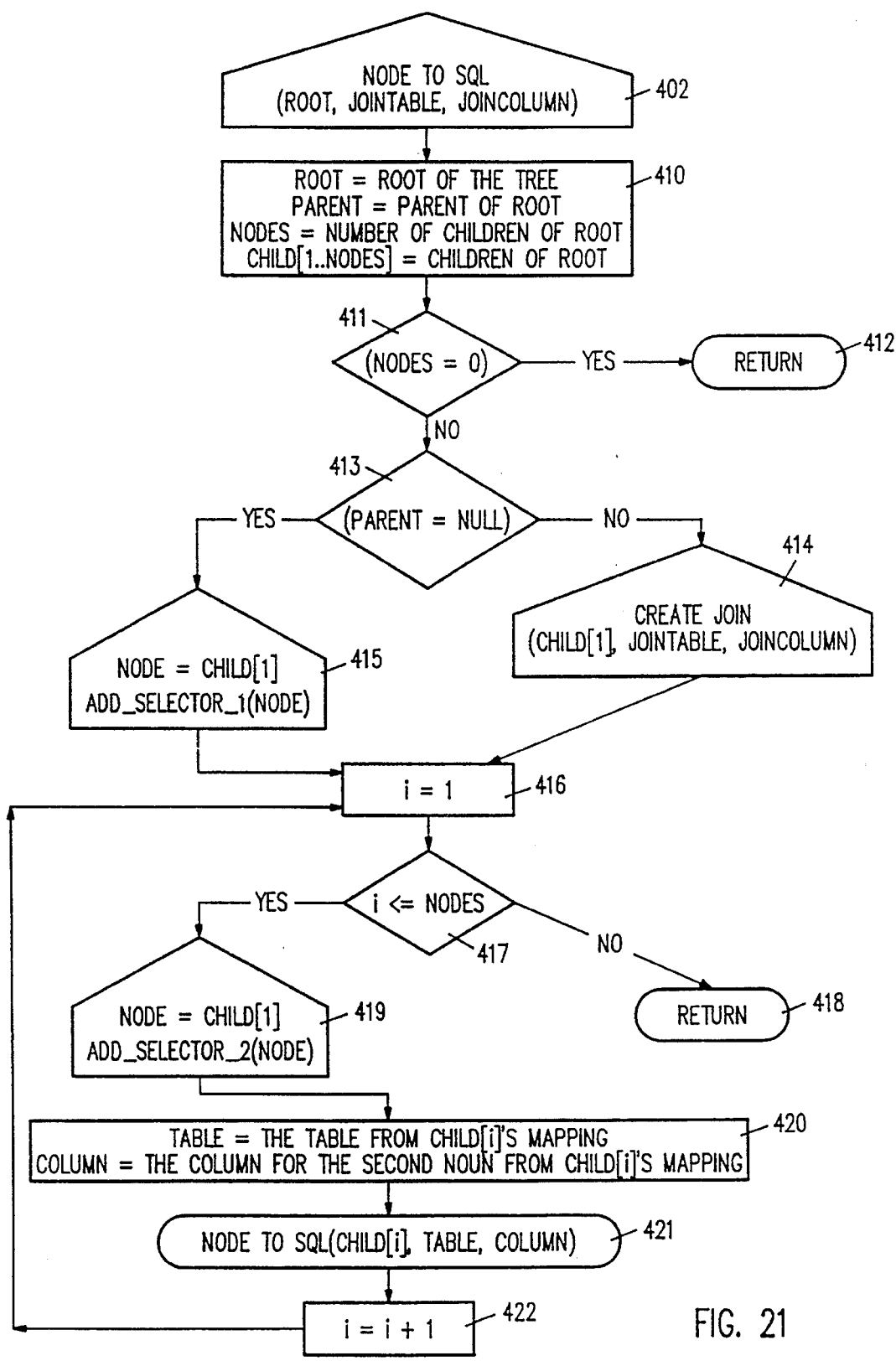
FIG. 21 is a flow chart illustrating the Node to SQL function invoked by the Fact Tree to SQL function.
Figure 23:
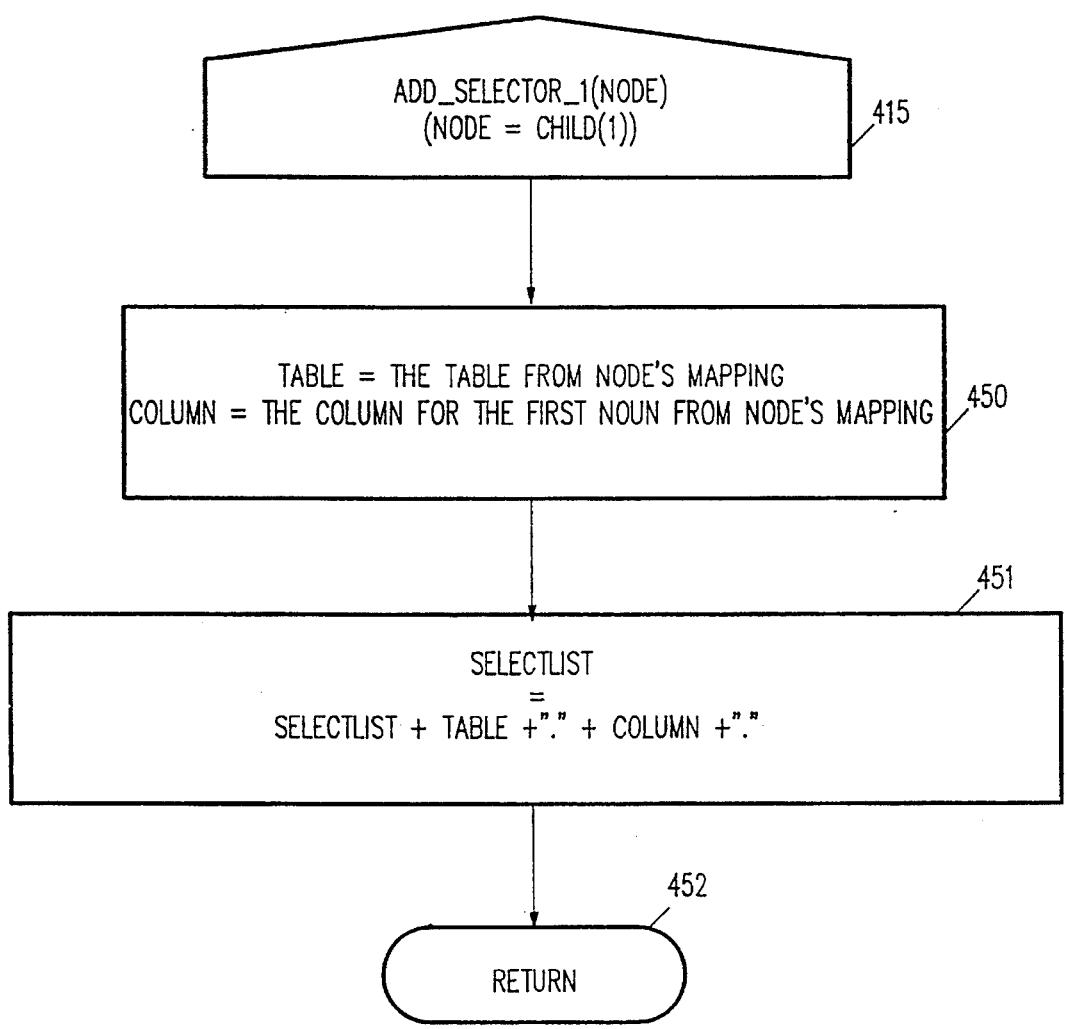
FIG. 23 is a flow chart illustrating the Add Selector 1 function invoked by the Node to SQL function.

Referring back to FIG. 21, function 415, Add_Selector_1 is detailed at FIG. 23. This function adds Node's table to the FromList and the column for Node's first noun to the SelectList.

Figure 24:
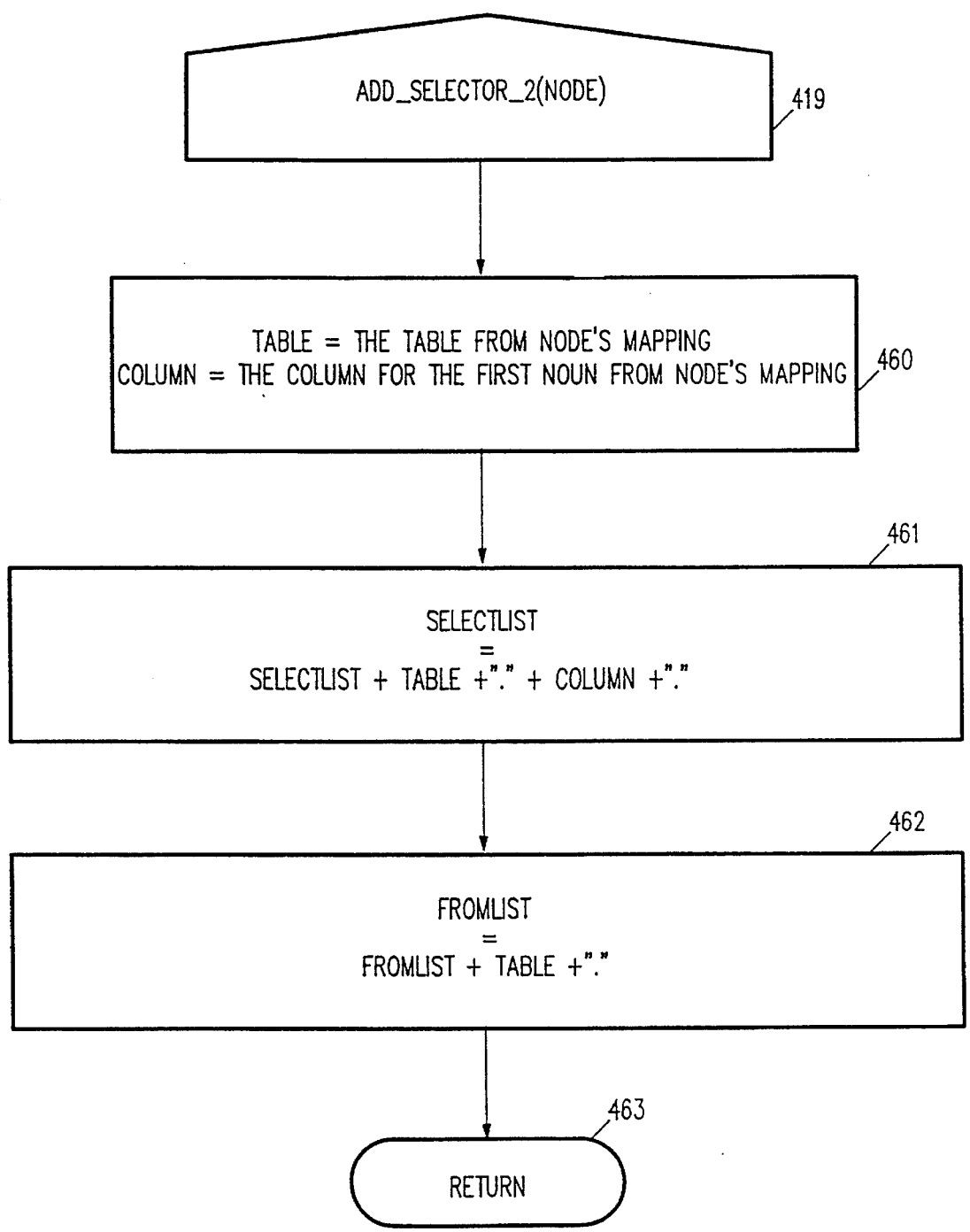
FIG. 24 is a flow chart illustrating the Add Selector 2 function invoked by the Node to SQL function.

Referring again to FIG. 21, function 419, Add_Selector_2 is detailed at FIG. 24. This function adds Node's table to the FromList and the column for Node's second noun to the SelectList.

It is to be understood that the above-described embodiments are merely illustrative of some of the many specific embodiments which represent applications of the principles of the present invention. Clearly, numerous variations can be readily devised by those skilled in the art without departing from the scope of the present invention.

What is claimed is:

1. Apparatus for specifying database designs including a general purpose programmable digital computer, said computer having central processing unit, bus, display device, data entry device, memory, graphical user interface, and repository means, said apparatus further comprising:

diagram means for producing a diagram on said display device;

cursor control means, responsive to said data entry device, for controlling movement of a cursor over said diagram;

text input means, responsive to said data entry device, for entering text into an edit window, items of said text including objects, facts about said objects, and constraints on said objects;

text translation means for translating a text item from said edit window into said diagram, including (a) capture means, responsive to a first selector means of said data entry device, for capturing an item of said text from within said edit window, (b) item test means, responsive to said capture means, for testing whether a text item is an object, a fact or a constraint, (c) cursor change means, responsive to said item test means, for changing said cursor to reflect whether said text item is an object, a fact or a constraint, (d) cursor release means, further responsive to said first selector means of said data entry device, for dropping said text item onto said diagram, (e) text collection means for collecting said text item at said edit window, (f) parsing means, responsive to said text collection means, for parsing said text item into objects, facts, and constraints, (g) first update means for updating said repository by copying said objects, facts and constraints into said repository as records, (h) said diagram means, further responsive to said cursor control device, said capture means, said item test means, said cursor change means, said cursor release means, and said parsing means, for drawing said objects, facts and constraints on said diagram;

text validation means including (a) first text combining means for combining said text from said edit window, (b) said parsing means, further responsive to said first text combining means, for parsing said text into said objects, facts and constraints, (c) first error checking means, further responsive to said parsing means, for determining if an error exists in said objects, facts or constraints; and text compilation means for compiling said text only into said repository means.

2. The apparatus of claim 1, wherein said text translation means further comprises:

second error checking means responsive to position of said cursor, for determining if said cursor is over said diagram;

third error checking means for checking if one or more errors exists in any of said objects, facts or constraints after operation of said parsing means; and said diagram means, further responsive to said second error checking means for drawing said item on said diagram.

3. The apparatus according to claim 1 wherein said parsing means further comprises:

scan means for returning a token corresponding to said text item;

partition means, responsive to said scan means, for partitioning into sections each token retrieved by said scan means;

token test means, responsive to said partition means, for testing whether each of said sections is an object, a fact or a constraint: and terminal test means, responsive to said token test means, for testing if each of said sections is a terminal section.

4. The apparatus of claim 3 further comprising, upon a determination by said token test means that said section is an object:

iterative parse means for iteratively continuing to parse said section;

iterative scan means for iteratively continuing to scan said section;

structuring means, responsive to a determination by said iterative parse means and said iterative scan means that said section is still an object, for structuring said object for storage in a first list;

object status test means, responsive to said structuring means for testing whether said object was previously stored in said first list, whether said object was previously stored in said repository means but not stored in a first list, or whether said object is newly created;

object listing means, responsive to a determination by said object status test means that said object was previously stored in said repository means but not stored in said first list, for copying said object from said repository means and storing said object in said first list; and new object allocation means, responsive to a determination by said object status test means that said object is newly created, for allocating said newly created object to said repository means.

5. The apparatus of claim 3 further comprising, upon a determination by said token test means that said section is a fact:

iterative parse means for iteratively continuing to parse said section;

iterative scan means for iteratively continuing to scan said section;

structuring means, responsive to a determination by said iterative parse means and said iterative scan means that said section is still a fact, for structuring said fact for storage in a first list;

fact status test means, responsive to said structuring means, for testing whether said fact was previously stored in said first list, whether said fact was previously stored in said repository means but not stored in said first list, or whether said fact is newly created;

fact listing means, responsive to a determination by said fact status test means that said object was previously stored in said repository means but not stored in said first list, for copying said fact from said repository means and storing said fact in said first list; and new fact allocation means, responsive to a determination by said fact status test means that said fact is newly created, for allocating said newly created fact to said repository means.

6. The apparatus of claim 3 further comprising, upon a determination by said token test means that said section is a constraint:

iterative parse means for iteratively continuing to parse said section;

iterative scan means for iteratively continuing to scan said section;

structuring means, responsive to a determination by said iterative parse means and said iterative scan means that said section is still a constraint, for structuring said constraint for storage in a first list;

constraint status test means, responsive to said structuring means for testing whether said constraint was previously stored in said first list, whether said constraint was previously stored in said repository means but not stored in a first list, or whether said constraint is newly created;

constraint listing means, responsive to a determination by said constraint status test means that said object was previously stored in said repository means but not stored in said first list, for copying said constraint from said repository means and storing said constraint in said first list; and new constraint allocation means, responsive to a determination by said constraint status test means that said constraint is newly created, for allocating said newly created constraint to said repository means.

7. The apparatus of claim 1 wherein said text compilation means further comprises:

second text combining means for combining all text from said edit window into an item;

said parsing means for parsing said item into objects, facts and constraints;

first list, further responsive to said parsing means for storing said each of said objects, facts and constraints into said memory means as a record;

record status test means for testing said record as being a newly created record, a changed record, or an unchanged record;

second update means, responsive to a determination by said record status test means that said record is changed or is newly created, for updating said repository means by copying said objects, facts and constraints from said third list means and storing said objects, facts and constraints into said repository means as records;

record type test means, responsive to said second update means having stored a newly created record to said repository, for testing whether said record is an object, a fact or a constraint;

new object allocation means, responsive to a determination by said record type test means that said record is a object and to a determination by said record status test means that said record is newly created, for allocating said object to said repository means;

new fact allocation means, responsive to a determination by said record type test means that said record is a fact and to a determination by said record status test means that said record is newly created, for allocating said fact to said repository means; and new constraint allocation means, responsive to a determination by said record type test means that said record is a constraint and to a determination by said record status test means that said record is newly created, for allocating said constraint to said repository means.

8. The apparatus of claim 1, wherein said text translation means further comprises:

cursor rotation means, for rotating said cursor 90° each time said second selector means of said cursor control means is actuated; and said diagram means, further responsive to said cursor rotation means for drawing said item on said diagram.

9. The apparatus of claim 8, wherein said cursor rotation means rotates said cursor 90° in a clockwise direction each time said second selector means of said cursor control means is actuated.

10. The apparatus of claim 8, wherein said cursor rotation means rotates said cursor 90° in a counterclockwise direction each time said second selector means of said cursor control means is actuated.

11. The apparatus of claim 1, wherein said text translation means further comprises edit window clearing means, responsive to movement of said cursor over said diagram, for causing said edit window to disappear from said display means while said cursor is being moved.

12. A method for specifying database designs including a computer, said computer having central processing unit, bus, display device, data entry device, memory, graphical user interface, and repository, said method comprising the steps of:

producing a diagram on said display device;

controlling movement of a cursor over said diagram responsive to said data entry device;

entering text into an edit window further responsive to said data entry device, items of said text including objects, facts about said objects, and constraints on said objects;

translating a text item from said edit window into said diagram, including the steps of
 (a) capturing an item of said text from within said edit window, responsive to a first selector of said data entry device,
 (b) responsive to said step of capturing an item of said text, testing whether a text item is an object, a fact or a constraint,
 (c) changing said cursor to reflect whether said text item is an object, a fact or a constraint,
 (d) dropping said text item onto said diagram,
 (e) collecting said text item at said edit window,
 (f) parsing said text item into objects, facts, and constraints,
 (g) updating said repository by copying said objects, facts and constraints into said repository as records, and
 (h) further responsive to said cursor control device and said steps of capturing an item of said text, testing whether a text item is an object, a fact or a constraint, changing said cursor, dropping said text item, and parsing said text item into objects, facts, and constraints, drawing said objects, facts and constraints on said diagram;

validating said text, including the steps of
 (a) combining said text from said edit window into an item,
 (b) said parsing step for parsing said text item into objects, facts, and constraints,
 (c) responsive to said step of parsing said text, determining if an error exists in said objects, facts or constraints; and compiling said text only into said repository.

13. The method of claim 12, wherein said step of translating a text item from said edit window into said diagram further comprises the steps of:

determining, responsive to position of said cursor, if said cursor is over said diagram;

checking if one or more errors exists in any of said objects, facts or constraints following said parsing step;

said drawing step, further responsive to said step of checking if one or more errors exists in any of said objects, facts or constraints.

14. The method according to claim 12 wherein said parsing step further comprises the steps of:

returning a token corresponding to said text item;

partitioning into sections each token retrieved by said step of returning a token;

testing whether each of said sections is an object, a fact or a constraint; and testing whether each of said sections is a terminal section.

15. Upon a determination by said step of testing whether each of said sections is an object, a fact or a constraint that said section is an object, the method of claim 14 further comprising the steps of:

iteratively continuing to parse said section;

iteratively continuing to scan said section;

responsive to a determination by said steps of iteratively continuing to parse said section and iteratively continuing to scan said section that said section is still an object, structuring said object for storage in a list;

responsive to said step of structuring said object for storage in a list, testing the status of said object as previously stored in said list, previously stored in said repository but not stored in a list, or as newly created;

responsive to a determination by said step of testing the status of said object that said object was previously stored in said repository but not stored in said list, copying said object from said repository and storing said object in said list; and responsive to a determination by said step of testing the status of said object that said object is newly created, allocating said newly created object to said repository.

16. Upon a determination by said step of testing whether each of said sections is an object, a fact or a constraint that said section is an fact, the method of claim 14 further comprising the steps of:

iteratively continuing to parse said section;

iteratively continuing to scan said section;

responsive to a determination by said steps of iteratively continuing to parse said section and iteratively continuing to scan said section that said section is still an fact, structuring said fact for storage in a list;

responsive to said step of structuring said fact for storage in a list, testing the status of said fact as previously stored in said list, previously stored in said repository but not stored in a list, or as newly created;

responsive to a determination by said step of testing the status of said fact that said fact was previously stored in said repository but not stored in said list, copying said fact from said repository and storing said fact in said list; and responsive to a determination by said step of testing the status of said fact that said fact is newly created, allocating said newly created fact to said repository.

17. Upon a determination by said step of testing whether each of said sections is an object, a constraint or a constraint that said section is an constraint, the method of claim 14 further comprising the steps of:

iteratively continuing to parse said section;

iteratively continuing to scan said section;

responsive to a determination by said steps of iteratively continuing to parse said section and iteratively continuing to scan said section that said section is still an constraint, structuring said constraint for storage in a list;

responsive to said step of structuring said constraint for storage in a list, testing the status of said constraint as previously stored in said list, previously stored in said repository but not stored in a list, or as newly created;

responsive to a determination by said step of testing the status of said constraint that said constraint was previously stored in said repository but not stored in said list, copying said constraint from said repository and storing said constraint in said list; and responsive to a determination by said step of testing the status of said constraint that said constraint is newly created, allocating said newly created constraint to said repository.

18. The method of claim 12 wherein said step of compiling said text only into said repository further comprises the steps of:

combining all text from said edit window into an item;

said step of parsing said item into objects, facts and constraints;

storing said each of said objects, facts and constraints into said memory as a record in a list;

testing said record as being a newly created record, a changed record, or an unchanged record;

responsive to a determination by said step of testing said record as being a newly created record, a changed record, or an unchanged record, that said record is changed or is newly created, updating said repository by copying said record from said list into said repository;

responsive to said step of updating said repository, testing whether said record is an object, a fact or a constraint;

responsive to a determination by said step of testing whether said record is an object, a fact or a constraint, that said record is a object and further responsive to a determination by said step of testing said record as being a newly created record, a changed record, or an unchanged record that said record is newly created, allocating said object to said repository;

responsive to a determination by said step of testing whether said record is an object, a fact or a constraint, that said record is a fact and further responsive to a determination by said step of testing said record as being a newly created record, a changed record, or an unchanged record that said record is newly created, allocating said fact to said repository; and responsive to a determination by said step of testing whether said record is an object, a fact or a constraint, that said record is a constraint and further responsive to a determination by said step of testing said record as being a newly created record, a changed record, or an unchanged record that said record is newly created, allocating said constraint to said repository.

19. The method of claim 12, wherein said step translating a text item from said edit window into said diagram further comprises the steps of:

rotating said cursor 90° each time said second selector of said cursor control device is actuated; and further responsive to said step of rotating said cursor, said step of drawing said objects, facts and constraints on said diagram, for drawing said text item on said diagram.

20. The method of claim 19, wherein said step of rotating said cursor rotates said cursor 90° in a clockwise direction each time said second selector of said cursor control device is actuated.

21. The method of claim 19, wherein said step of rotating said cursor rotates said cursor 90° in a counterclockwise direction each time said second selector of said cursor control device is actuated.

22. The method of claim 12, responsive to the movement of said cursor over said diagram, wherein said step of translating a text item further comprises the step of causing said edit window to disappear from said display while said cursor is being moved.

\* \* \* \* \*